United States Patent
Bright et al.

(10) Patent No.: US 7,077,723 B2
(45) Date of Patent: Jul. 18, 2006

(54) POROUS ABRASIVE ARTICLES WITH AGGLOMERATED ABRASIVES AND METHOD FOR MAKING THE AGGLOMERATED ABRASIVES

(75) Inventors: Eric Bright, Fiskdale, MA (US); Mianxue Wu, Suwanee, GA (US)

(73) Assignee: Saint-Gobain Abrasives Technology Company, Worcester, MA (US)

( * ) Notice: Subject to any disclaimer, the term of this patent is extended or adjusted under 35 U.S.C. 154(b) by 0 days.

(21) Appl. No.: 10/668,531

(22) Filed: Sep. 23, 2003

(65) Prior Publication Data
US 2005/0101225 A1    May 12, 2005

Related U.S. Application Data

(62) Division of application No. 10/120,969, filed on Apr. 11, 2002, now Pat. No. 6,679,758.

(51) Int. Cl.
*B24B 1/00* (2006.01)
*C09K 3/14* (2006.01)

(52) U.S. Cl. ................. 451/28; 51/298; 51/307; 451/530

(58) Field of Classification Search .......... 451/530, 451/532; 51/298, 307, 295, 309
See application file for complete search history.

(56) References Cited

U.S. PATENT DOCUMENTS

| | | | |
|---|---|---|---|
| 1,983,082 A | 12/1934 | Howe et al. | |
| 2,194,472 A | 3/1940 | Jackson | |
| 2,216,728 A | 10/1940 | Benner et al. | |
| 3,048,482 A | 8/1962 | Hurst | |
| 3,916,584 A | 11/1975 | Howard et al. | |
| 3,955,324 A | 5/1976 | Lindstrom | |
| 3,982,359 A | 9/1976 | Elbel et al. | |
| 4,024,675 A | 5/1977 | Naidich et al. | |
| 4,311,489 A | 1/1982 | Kressner | |
| 4,393,021 A | 7/1983 | Eisenberg et al. | |
| 4,541,842 A | 9/1985 | Rostoker | |
| 4,575,384 A | 3/1986 | Licht et al. | |
| 4,652,275 A | 3/1987 | Bloecher et al. | |
| 4,799,939 A | 1/1989 | Bloecher et al. | |
| 5,039,311 A | 8/1991 | Bloecher | |
| 5,127,197 A | 7/1992 | Brukvoort et al. | |
| 5,129,189 A | 7/1992 | Wetscher | |
| 5,273,558 A | 12/1993 | Nelson et al. | |
| 5,489,204 A | 2/1996 | Conwell et al. | |
| 5,498,268 A * | 3/1996 | Gagliardi et al. | 51/294 |
| 5,500,273 A | 3/1996 | Holmes et al. | |
| 5,551,962 A * | 9/1996 | Ho | 51/306 |
| 5,562,745 A * | 10/1996 | Gagliardi et al. | 51/298 |
| 5,651,729 A | 7/1997 | Benguerel | |
| 5,651,801 A | 7/1997 | Monroe et al. | |
| 5,738,695 A | 4/1998 | Harmer et al. | |

(Continued)

FOREIGN PATENT DOCUMENTS

GB    491659    9/1938

(Continued)

*Primary Examiner*—Hadi Shakeri
(74) *Attorney, Agent, or Firm*—Mary E. Porter

(57) ABSTRACT

A bonded abrasive tool, having a structure permeable to fluid flow, comprises sintered agglomerates of a plurality of abrasive grains and a binding material, the binding material being characterized by a melting temperature between 500 and 1400° C., and the sintered agglomerates having a loose packing density of $\leq 1.6$ g/cc and three-dimensional shape; a bond material; and about 35–80 volume % total porosity, including at least 30 volume % interconnected porosity. Methods for making the sintered agglomerates and abrasive tools containing the sintered agglomerates are described.

14 Claims, 2 Drawing Sheets

U.S. PATENT DOCUMENTS

| | | |
|---|---|---|
| 5,738,696 A | 4/1998 | Wu |
| 5,738,697 A | 4/1998 | Wu et al. |
| 5,849,052 A | 12/1998 | Barber, Jr. |
| 5,863,308 A | 1/1999 | Qi et al. |
| 5,975,988 A | 11/1999 | Christianson |
| 6,086,467 A | 7/2000 | Imai et al. |
| 6,086,648 A | 7/2000 | Rossetti, Jr. et al. |
| 6,136,288 A | 10/2000 | Bauer et al. |
| 6,217,413 B1 | 4/2001 | Christianson |
| 6,319,108 B1 | 11/2001 | Adefris et al. |
| 6,354,929 B1 | 3/2002 | Adefris et al. |

FOREIGN PATENT DOCUMENTS

| | | |
|---|---|---|
| GB | 1228319 | 4/1971 |
| GB | 1418730 | 12/1975 |
| WO | 96/10471 | 4/1996 |
| WO | 98/03306 | 1/1998 |
| WO | 00/51788 | 9/2000 |
| WO | 01/04227 | 1/2001 |
| WO | 01/83166 A1 | 11/2001 |
| WO | 01/85393 A1 | 11/2001 |
| WO | 02/28802 A2 | 4/2002 |

\* cited by examiner

POROUS ABRASIVE ARTICLES WITH AGGLOMERATED ABRASIVES AND METHOD FOR MAKING THE AGGLOMERATED ABRASIVES

This application is a divisional application having priority in U.S. Patent Ser. No. 10/120,969 filed Apr. 11, 2002, now 6,679,758B2, granted Jan. 20, 2004.

BACKGROUND OF THE INVENTION

The invention relates to bonded abrasive articles or grinding tools made porous by the use of certain agglomerated abrasive grains and to methods for making the agglomerated abrasive grains.

Grinding tools are manufactured in a variety of grades or structures determined by the relative volume percentage of abrasive grain, bond and porosity within a composite abrasive grain matrix. In many grinding operations, grinding tool porosity, particularly porosity of a permeable, or an interconnected nature, improves efficiency of the grinding operation and quality of the workpiece being ground. Porosity inducers, such as bubble alumina and naphthalene, may be added to abrasive composite mixtures to permit pressure molding and handling of a porous uncured abrasive article and to yield an adequate volume percent porosity in the final tool.

Natural porosity arising from packing of the abrasive grains and bond particles during pressure molding is insufficient to achieve a porosity character that is desirable for some grinding operations. Pore inducers have been added to achieve high porosity percentages, however, open channels or interconnected porosity cannot be achieved with the pore inducers known in the art (e.g., hollow ceramic or glass spheres). Some pore induces must be burnt out of the abrasive matrix (e.g., walnut shells and naphthalene), giving rise to various manufacturing difficulties. Further, the densities of pore inducers, bond materials and abrasive grains vary significantly, often causing stratification of the abrasive mix during handling and molding, and, in turn, loss of homogeneity in the three-dimensional structure of the finished abrasive article.

The volume percent of interconnected porosity, or fluid permeability, has been found to be a more significant determinant of grinding performance of abrasive articles than mere volume percent porosity. U.S. Pat. No. 5,738,696 to Wu discloses a method for making bonded abrasives utilizing elongated abrasive grain having an aspect ratio of at least 5:1. The bonded abrasive wheels have a permeable structure containing 55–80%, by volume, of interconnected porosity. The interconnected porosity allows removal of grinding waste (swarf) and passage of cooling fluid within the wheel during grinding. The existence of interconnected porosity is confirmed by measuring the permeability of the wheel to the flow of air under controlled conditions. The filamentary abrasive grains are not agglomerated or otherwise coated with bond prior to assembling the wheel. U.S. Pat. No. 5,738,697 to Wu discloses high permeability grinding wheels having a significant amount of interconnected porosity (40–80%, by volume). These wheels are made from a matrix of fibrous particles having an aspect ratio of at least 5:1. The fibrous particles may be sintered sol gel alumina abrasive grain or ordinary, non-fibrous abrasive grains blended with various fibrous filler materials such as ceramic fiber, polyester fiber and glass fiber and mats and agglomerates constructed with the fiber particles. The filamentary abrasive grains are not agglomerated or otherwise coated with bond prior to assembling the wheel.

Abrasive grain has been agglomerated for various purposes, principal among them to allow use of a smaller particle (grit) size to achieve the same grinding efficiency as a larger abrasive grit size. In many instances abrasive grain has been agglomerated with bond materials to achieve a less porous structure and a denser grinding tool, having more strongly bonded abrasive grains. Agglomerated abrasive grains have been reported to improve grinding efficiency by mechanisms entirely unrelated to the amount or character of the porosity of the abrasive article.

U.S. Pat. No. 2,194,472 to Jackson discloses coated abrasive tools made with agglomerates of a plurality of relatively fine abrasive grain and any of the bonds normally used in coated or bonded abrasive tools. Organic bonds are used to adhere the agglomerates to the backing of the coated abrasives. The agglomerates lend an open-coat face to coated abrasives made with relatively fine grain. The coated abrasives made with the agglomerates in place of individual abrasive grains are characterized as being relatively fast cutting, long-lived and suitable for preparing a fine surface finish quality in the work-piece.

U.S. Pat. No. 2,216,728 to Benner discloses abrasive grain/bond aggregates made from any type of bond. The object of the aggregates is to achieve very dense wheel structures for retaining diamond or CBN grain during grinding operations. If the aggregates are made with a porous structure, then it is for the purpose of allowing the inter-aggregate bond materials to flow into the pores of the aggregates and fully densify the structure during firing. The aggregates allow the use of abrasive grain fines otherwise lost in production.

U.S. Pat. No. 3,048,482 to Hurst discloses shaped abrasive micro-segments of agglomerated abrasive grains and organic bond materials in the form of pyramids or other tapered shapes. The shaped abrasive micro-segments are adhered to a fibrous backing and used to make coated abrasives and to line the surface of thin grinding wheels. The invention is characterized as yielding a longer cutting life, controlled flexibility of the tool, high strength and speed safety, resilient action and highly efficient cutting action relative to tools made without agglomerated abrasive grain micro-segments.

U.S. Pat. No. 3,982,359 to Elbel teaches the formation of resin bond and abrasive grain aggregates having a hardness greater than that of the resin bond used to bond the aggregates within an abrasive tool. Faster grinding rates and longer tool life are achieved in rubber bonded wheels containing the aggregates.

U.S. Pat. No. 4,355,489 to Heyer discloses an abrasive article (wheel, disc, belt, sheet, block and the like) made of a matrix of undulated filaments bonded together at points of manual contact and abrasive agglomerates, having a void volume of about 70–97%. The agglomerates may be made with vitrified or resin bonds and any abrasive grain.

U.S. Pat. No. 4,364,746 to Bitzer discloses abrasive tools comprising different abrasive agglomerates having different strengths. The agglomerates are made from abrasive grain and resin binders, and may contain other materials, such as chopped fibers, for added strength or hardness.

U.S. Pat. No. 4,393,021 to Eisenberg, et al, discloses a method for making abrasive agglomerates from abrasive grain and a resin binder utilizing a sieve web and rolling a paste of the grain and binder through the web to make worm-like extrusions. The extrusions are hardened by heating and then crushed to form agglomerates.

U.S. Pat. No. 4,799,939 to Bloecher teaches erodable agglomerates of abrasive grain, hollow bodies and organic binder and the use of these agglomerates in coated abrasives and bonded abrasives. Higher stock removal, extended life and utility in wet grinding conditions are claimed for abrasive articles comprising the agglomerates. The agglomerates are preferably 150–3,000 microns in largest dimension. To make the agglomerates, the hollow bodies, grain, binder and water are mixed as a slurry, the slurry is solidified by heat or radiation to remove the water, and the solid mixture is crushed in a jaw or roll crusher and screened.

U.S. Pat. No. 5,129,189 to Wetshcer discloses abrasive tools having a resin bond matrix containing conglomerates of abrasive grain and resin and filler material, such as cryolite.

U.S. Pat. No. 5,651,729 to Benguerel teaches a grinding wheel having a core and an abrasive rim made from a resin bond and crushed agglomerates of diamond or CBN abrasive grain with a metal or ceramic bond. The stated benefits of the wheels made with the agglomerates include high chip clearance spaces, high wear resistance, self-sharpening characteristics, high mechanical resistance of the wheel and the ability to directly bond the abrasive rim to the core of the wheel. In one embodiment, used diamond or CBN bonded grinding rims are crushed to a size of 0.2 to 3 mm to form the agglomerates.

U.S. Pat. No. 4,311,489 to Kressner discloses agglomerates of fine ($\leqq 200$ micron) abrasive grain and cryolite, optionally with a silicate binder, and their use in making coated abrasive tools.

U.S. Pat. No. 4,541,842 to Rostoker discloses coated abrasives and abrasive wheels made with aggregates of abrasive grain and a foam made from a mixture of vitrified bond materials with other raw materials, such as carbon black or carbonates, suitable for foaming during firing of the aggregates. The aggregate "pellets" contain a larger percentage of bond than grain on a volume percentage basis. Pellets used to make abrasive wheels are sintered at 900° C. (to a density of 70 lbs/cu. ft.; 1.134 g/cc) and the vitrified bond used to make the wheel is fired at 880° C. Wheels made with 16 volume % pellets performed in grinding with an efficiency similar to that of comparative wheels made with 46 volume % abrasive grain. The pellets contain open cells within the vitrified bond matrix, with the relative smaller abrasive grains clustered around the perimeter of the open cells. A rotary kiln is mentioned for firing pre-agglomerated green aggregates to later foam and sinter to make the pellets.

U.S. Pat. No. 5,975,988 to Christianson discloses coated abrasive articles include a backing and an organic bonded abrasive layer where the abrasive is present as shaped agglomerates in the shape of a truncated four-sided pyramid or cube. The agglomerates are made from superabrasive grains bonded in an inorganic binder having a coefficient of thermal expansion which is the same or substantially the same as a coefficient of thermal expansion of the abrasive grain.

WO 00/51788 to Stoetzel, et al, discloses abrasive articles have a backing, an organic bond containing hard inorganic particles dispersed within it, and abrasive particle agglomerates bonded to the backing. The abrasive particles in the agglomerates and the hard inorganic particles in the organic bond are essential the same size. Agglomerates may be randomly or precisely shaped and they are made with an organic bond. The hard inorganic particles may be any of a number of abrasive grain particles.

U.S. Pat. No. 6,086,467 to Imai, et al, discloses grinding wheels contain abrasive grain and grain clusters of filler grain having a smaller size than the abrasive grain. Vitrified bond may be used and the filler grain may be chromium oxide. The size of the grain clusters is ⅓ or more of the size of the abrasive grain. Benefits include controlled bond erosion and abrasive grain retention in low force grinding applications utilizing superabrasive grain wherein the superabrasive grain must be diluted to minimize grinding forces. Clusters of filler grain may be formed with wax. No sintering of the clusters is disclosed.

WO 01/04227 A2 to Adefris, et al, discloses an abrasive article comprises a rigid backing and ceramic abrasive composites made of abrasive particles in a porous ceramic matrix. The composites are held to the backing with a metal coating, such an electroplated metal.

None of these prior art developments suggest the manufacture of abrasive articles using porous agglomerated abrasive grain and bond particles to control the percentage and character of porosity and to maintain porosity in the form of permeable, interconnected porosity in bonded abrasive articles. No suggestion is made to use a rotary calciner method to manufacture a variety of abrasive grain agglomerates for use in the abrasive articles. The methods and tools of the invention yield new structures from agglomerated mixtures of existing abrasive grain and bond combinations, and they are sophisticated in permitting the controlled design and manufacture of broad ranges of abrasive article structures having beneficial, bi-modal, interconnected porosity characteristics. Such bi-modal, interconnected porosity enhances abrasive tool performance, particularly in large contact area, precision-grinding operations, such as creepfeed surface grinding, inner diameter grinding and toolroom grinding processes.

SUMMARY OF THE INVENTION

The invention is a bonded abrasive tool, having a structure permeable to fluid flow, the tool comprising:

a) about 5–75 volume % sintered agglomerates, comprising a plurality of abrasive grains held with a binding material, the binding material being characterized by a melting temperature between 500 and 1400° C., and the sintered agglomerates having a three dimensional shape and an initial size distribution prior to manufacture of the tool;

b) a bond; and c) about 35–80 volume % total porosity, the porosity including at least 30 volume % interconnected porosity;

wherein at least 50%, by weight, of the sintered agglomerates within the bonded abrasive tool retain a plurality of abrasive grains held in a three-dimensional shape after manufacture of the tool.

In another embodiment, the invention includes a vitrified bonded abrasive tool, having a structure permeable to fluid flow, the tool comprising:

a) about 5–75 volume % sintered agglomerates of a plurality of abrasive grain with a binding material, the binding material being characterized by a viscosity A at the binding material melting temperature;

b) a vitrified bond characterized by a viscosity B at the binding material melting temperature, viscosity B being at least 33% lower than viscosity A; and c) about 35–80 volume % porosity, including at least 30 volume % interconnected porosity.

The invention further includes a vitrified bonded abrasive tool, having a structure permeable to fluid flow, the tool comprising:

a) about 5–60 volume % sintered agglomerates of a plurality of abrasive grain with a binding material, the binding material being characterized by a melting temperature A;
b) a vitrified bond characterized by a melting temperature B, melting temperature B being at least 150° C. lower than melting temperature A; and
c) about 35–80 volume % porosity, including at least 30 volume % interconnected porosity.

In another aspect of the invention, the tool is a bonded abrasive tool, having a structure permeable to fluid flow, the tool comprising:
a) about 34–56 volume % abrasive grain;
b) about 3–25 volume % bond; and
c) about 35–80 volume % total porosity, including at least 30 volume % interconnected porosity;

wherein the interconnected porosity has been created without the addition of porosity inducing media and without the addition of elongated shaped materials having a length to cross-sectional width aspect ratio of at least 5:1.

The invention further includes processes for making the agglomerates and the tools of the invention.

The invention includes a method of agglomerating abrasive grain, comprising the steps:
a) feeding the grain and a binding material, selected from the group consisting essentially of vitrified bond materials, vitrified materials, ceramic materials, inorganic binders, organic binders, water, solvent and combinations thereof, into a rotary calcination kiln at a controlled feed rate;
b) rotating the kiln at a controlled speed;
c) heating the mixture at a heating rate determined by the feed rate and the speed of the kiln to temperatures from about 145 to 1,300° C.,
d) tumbling the grain and the binding material in the kiln until the binding material adheres to the grain and a plurality of grains adhere together to create a plurality of sintered agglomerates; and
e) recovering the sintered agglomerates from the kiln, whereby the sintered agglomerates have an initial three-dimensional shape, a loose packing density of ≦1.6 g/cc and comprise a plurality of abrasive grains.

The invention also includes sintered agglomerates of abrasive grain, made by a method comprising the steps:
a) feeding abrasive grain with a binding material into a rotary calcination kiln at a controlled feed rate;
b) rotating the kiln at a controlled speed;
c) heating the mixture at a heating rate determined by the feed rate and the speed of the kiln to temperatures from about 145 to 1,300° C.,
d) tumbling the grain and the binding material in the kiln until the binding material adheres to the grain and a plurality of grains adhere together to create a plurality of sintered agglomerates; and
e) recovering the sintered agglomerates from the kiln, whereby the sintered agglomerates have an initial three-dimensional shape, a loose packing density of ≦1.6 g/cc and contain a plurality of abrasive grains.

Using this process, an abrasive tool, comprising 5 to 75 volume % abrasive grain agglomerates, is made by a method comprising the steps:
a) feeding abrasive grain and a binding material, selected from the group consisting essentially of vitrified bond materials, vitrified materials, ceramic materials, inorganic binders, organic binders and combinations thereof, into a rotary calcination kiln at a controlled feed rate;
b) rotating the kiln at a controlled speed;
c) heating the mixture at a heating rate determined by the feed rate and the speed of the kiln to temperatures from about 145 to 1,300° C.,
d) tumbling the mixture in the kiln until the binding material adheres to the grain and a plurality of grains adhere together to create a plurality of sintered agglomerates;
e) recovering the sintered agglomerates from the kiln, the sintered agglomerates consisting of a plurality of abrasive grains bonded together by the binding material and having an initial three-dimensional shape and a loose packing density of ≦1.6 g/cc;
f) molding the sintered agglomerates into a shaped composite body; and
g) thermally treating the shaped composite body to form the abrasive tool.

Methods of grinding using the abrasive tools of the invention, in particular, methods of surface grinding, also are disclosed.

DESCRIPTION OF THE PREFERRED EMBODIMENTS

Abrasive Agglomerates

Figure 1:
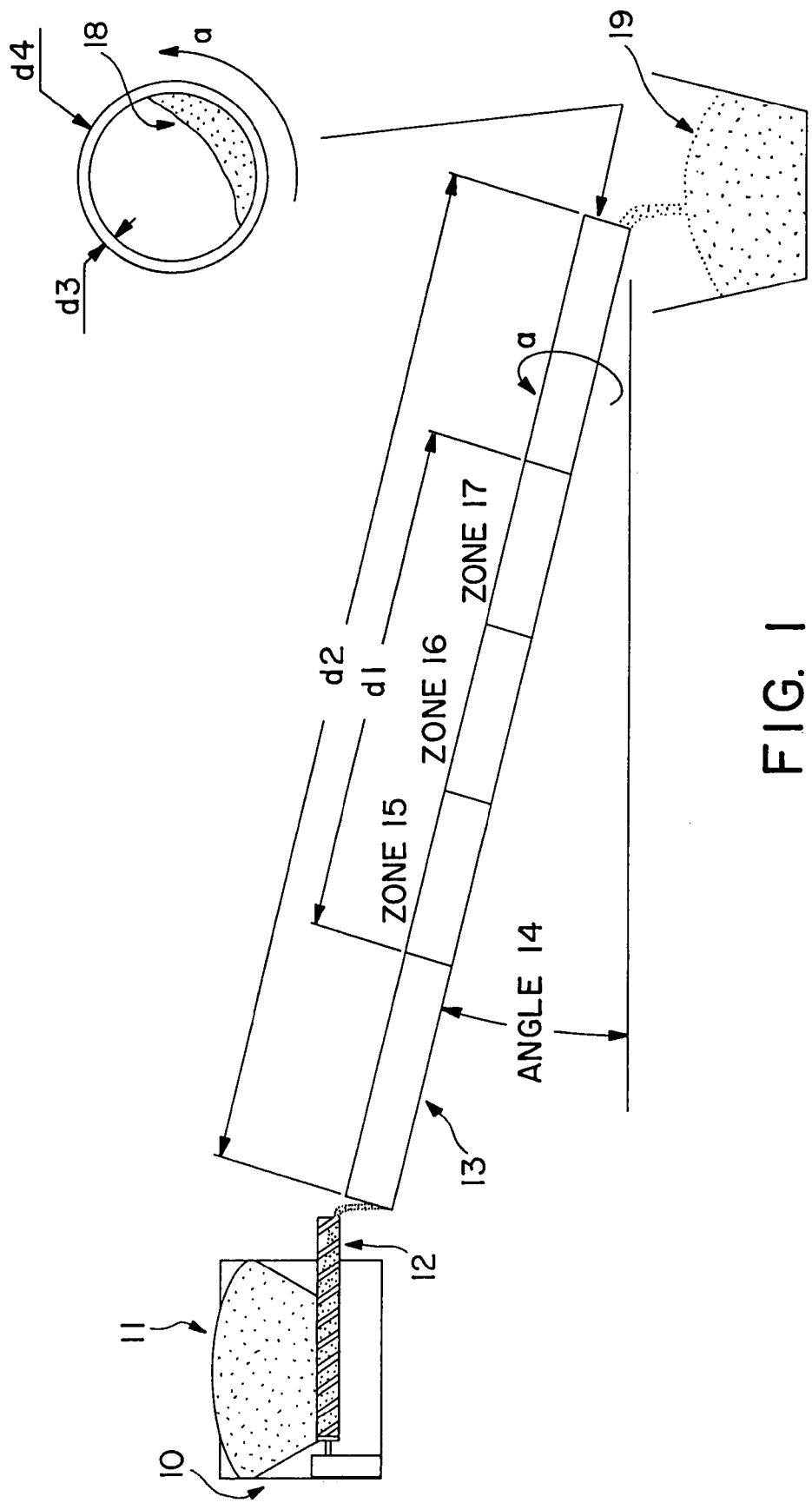
FIG. 1 is a schematic drawing of a rotary kiln for carrying out the process for manufacturing the abrasive grain agglomerates of the invention.

Abrasive grain agglomerates of the invention are three-dimensional structures or granules, including sintered porous composites of abrasive grain and binding material. The agglomerates have a loose packing density (LPD) of ≦1.6 g/cc, an average dimension of about 2 to 20 times the average abrasive grit size, and a porosity of about 30 to 88%, by volume. The abrasive grain agglomerates preferably have a minimum crush strength value of 0.2 MPa.

The abrasive grain may include one or more of the abrasive grains known for use in abrasive tools, such as the alumina grains, including fused alumina, sintered and sol gel sintered alumina, sintered bauxite, and the like, silicon carbide, alumina-zirconia, aluminoxynitride, ceria, boron suboxide, garnet, flint, diamond, including natural and synthetic diamond, cubic boron nitride (CBN), and combinations thereof. Any size or shape of abrasive grain may be used. For example, the grain may include elongated sintered sol gel alumina grains having a high aspect ratio of the type disclosed in U.S. Pat. No. 5,129,919.

Grain sizes suitable for use herein range from regular abrasive grits (e.g., greater than 60 and up to 7,000 microns) to microabrasive grits (e.g., 0.5 to 60 microns), and mixtures of these sizes. For a given abrasive grinding operation, it may be desirable to agglomerate an abrasive grain with a grit size smaller than an abrasive grain (non-agglomerated) grit size normally selected for this abrasive grinding operation. For example, agglomerated 80 grit size abrasive may be substituted for 54 grit abrasive, agglomerated 100 grit for 60 grit abrasive and agglomerated 120 grit for 80 grit abrasive.

The preferred sintered agglomerate size for typical abrasive grains ranges from about 200 to 3,000, more preferably 350 to 2,000, most preferably 425 to 1,000 micrometers in average diameter. For microabrasive grain, preferred sintered agglomerate size ranges from 5 to 180, more preferably 20 to 150, most preferably 70 to 120 micrometers in average diameter.

The abrasive grain is present at about 10 to 65 volume %, more preferably 35 to 55 volume %, and most preferably 48 to 52 volume % of the agglomerate.

Binding materials useful in making the agglomerates preferably include ceramic and vitrified materials, preferably of the sort used as bond systems for vitrified bonded abrasive tools. These vitrified bond materials may be a pre-fired glass ground into a powder (a frit), or a mixture of various raw materials such as clay, feldspar, lime, borax, and soda, or a combination of fritted and raw materials. Such materials fuse and form a liquid glass phase at temperatures ranging from about 500 to 1400° C. and wet the surface of the abrasive grain to create bond posts upon cooling, thus holding the abrasive grain within a composite structure. Examples of suitable binding materials for use in the agglomerates are given in Table 2, below. Preferred binding materials are characterized by a viscosity of about 345 to 55,300 poise at 1180° C., and by a melting temperature of about 800 to 1,300° C.

In a preferred embodiment, the binding material is a vitrified bond composition comprising a fired oxide composition of 71 wt % $SiO_2$ and $B_2O_3$, 14 wt % $Al_2O_3$, less than 0.5 wt % alkaline earth oxides and 13 wt % alkali oxides.

The binding material also may be a ceramic material, including, but not limited to, silica, alkali, alkaline-earth, mixed alkali and alkaline-earth silicates, aluminum silicates, zirconium silicates, hydrated silicates, aluminates, oxides, nitrides, oxynitrides, carbides, oxycarbides and combinations and derivatives thereof. In general, ceramic materials differ from glassy or vitrified materials in that the ceramic materials comprise crystalline structures. Some glassy phases may be present in combination with the crystalline structures, particularly in ceramic materials in an unrefined state. Ceramic materials in a raw state, such as clays, cements and minerals, may be used herein. Examples of specific ceramic materials suitable for use herein include, but are not limited to, silica, sodium silicates, mullite and other alumino silicates, zirconia-mullite, magnesium aluminate, magnesium silicate, zirconium silicates, feldspar and other alkali-alumino-silicates, spinels, calcium aluminate, magnesium aluminate and other alkali aluminates, zirconia, zirconia stabilized with yttria, magnesia, calcia, cerium oxide, titania, or other rare earth additives, talc, iron oxide, aluminum oxide, bohemite, boron oxide, cerium oxide, alumina-oxynitride, boron nitride, silicon nitride, graphite and combinations of these ceramic materials.

The binding material is used in powdered form and may be added to a liquid vehicle to insure a uniform, homogeneous mixture of binding material with abrasive grain during manufacture of the agglomerates.

A dispersion of organic binders is preferably added to the powdered binding material components as molding or processing aids. These binders may include dextrins, starch, animal protein glue, and other types of glue; a liquid component, such as water, solvent, viscosity or pH modifiers; and mixing aids. Use of organic binders improves agglomerate uniformity, particularly the uniformity of the binding material dispersion on the grain, and the structural quality of the pre-fired or green agglomerates, as well as that of the fired abrasive tool containing the agglomerates. Because the binders burn off during firing of the agglomerates, they do not become part of the finished agglomerate nor of the finished abrasive tool.

An inorganic adhesion promoter may be added to the mixture to improve adhesion of the binding materials to the abrasive grain as needed to improve the mix quality. The inorganic adhesion promoter may be used with or without an organic binder in preparing the agglomerates.

Although high temperature fusing binding materials are preferred in the agglomerates of the invention, the binding material also may comprise other inorganic binders, organic binders, organic bond materials, metal bond materials and combinations thereof. Binding materials used in the abrasive tool industry as bonds for organic bonded abrasives, coated abrasives, metal bonded abrasives and the like are preferred.

The binding material is present at about 0.5 to 15 volume %, more preferably 1 to 10 volume %, and most preferably 2 to 8 volume % of the agglomerate.

The preferred volume % porosity within the agglomerate is as high as technically possible within the agglomerate mechanical strength limitations needed to manufacture an abrasive tool and to grind with it. Porosity may range from 30 to 88 volume %, preferably 40 to 80 volume % and most preferably, 50–75 volume %. A portion (e.g., up to about 75 volume %) of the porosity within the agglomerates is preferably present as interconnected porosity, or porosity permeable to the flow of fluids, including liquids (e.g., grinding coolant and swarf) and air.

The density of the agglomerates may be expressed in a number of ways. The bulk density of the agglomerates may be expressed as the LPD. The relative density of the agglomerates may be expressed as a percentage of initial relative density, or as a ratio of the relative density of the agglomerates to the components used to make the agglomerates, taking into account the volume of interconnected porosity in the agglomerates.

The initial average relative density, expressed as a percentage, may be calculated by dividing the LPD ($\rho$) by a theoretical density of the agglomerates ($\rho_0$), assuming zero porosity. The theoretical density may be calculated according to the volumetric rule of mixtures method from the weight percentage and specific gravity of the binding material and of the abrasive grain contained in the agglomerates. For the sintered agglomerates of the invention, a maximum percent relative density is 50 volume %, with a maximum percent relative density of 30 volume % being more preferred.

The relative density may be measured by a fluid displacement volume technique so as to include interconnected porosity and exclude closed cell porosity. The relative density is the ratio of the volume of the sintered agglomerate measured by fluid displacement to the volume of the materials used to make the sintered agglomerate. The volume of the materials used to make the agglomerate is a measure of the apparent volume based on the quantities and packing densities of the abrasive grain and binder material used to make the agglomerates. For the sintered agglomerates of the invention, a maximum relative density of the sintered agglomerates preferably is 0.7, with a maximum relative density of 0.5 being more preferred.

Method of Manufacture of Abrasive Agglomerates

The agglomerates may be formed by a variety of techniques into numerous sizes and shapes. These techniques may be carried out before, during or after firing the initial ("green") stage mixture of grain and binding material. The step of heating the mixture to cause the binding material to melt and flow, thus adhering the binding material to the grain and fixing the grain in an agglomerated form is referred to as firing, calcining or sintering. Any method known in the art for agglomerating mixtures of particles may be used to prepare the abrasive agglomerates.

In a first embodiment of the process used herein to make agglomerates, the initial mixture of grain and binding material is agglomerated before firing the mixture so as to create a relatively weak mechanical structure referred to as a "green agglomerate" or "pre-fired agglomerate."

To carry out the first embodiment, the abrasive grain and binding materials may be agglomerated in the green state by a number of different techniques, e.g., in a pan pelletizer, and then fed into a rotary calcination apparatus for sintering. The green agglomerates may be placed onto a tray or rack and oven fired, without tumbling, in a continuous or batch process.

The abrasive grain may be conveyed into a fluidized bed, then wetted with a liquid containing the binding material to adhere the binding material to the grain, screened for agglomerate size, and then fired in an oven or calcination apparatus.

Pan pelletizing may be carried out by adding grain to a mixer bowl, and metering a liquid component containing the binding material (e.g., water, or organic binder and water) onto the grain, with mixing, to agglomerate them together. A liquid dispersion of the binding material, optionally with an organic binder, may be sprayed onto the grain, and then the coated grain may be mixed to form agglomerates.

A low-pressure extrusion apparatus may be used to extrude a paste of grain and binding material into sizes and shapes which are dried to form agglomerates. A paste may be made of the binding materials and grain with an organic binder solution and extruded into elongated particles with the apparatus and method disclosed in U.S. Pat. No. 4,393,021.

In a dry granulation process, a sheet or block made of abrasive grain imbedded in dispersion or paste of the binding material may be dried and then a roll compactor may be used to break the composite of grain and binding material.

In another method of making green or precursor agglomerates, the mixture of the binding material and the grain may be added to a molding device and the mixture molded to form precise shapes and sizes, for example, in the manner disclosed in U.S. Pat. No. 6,217,413 B1.

In a second embodiment of the process useful herein for making agglomerates, a simple mixture of the grain and binding material (optionally with an organic binder) is fed into a rotary calcination apparatus of the type shown in FIG. 1. The mixture is tumbled at a predetermined rpm, along a predetermined incline with the application of heat. Agglomerates are formed as the binding material mixture heats, melts, flows and adheres to the grain. The firing and agglomeration steps are carried out simultaneously at controlled rates and volumes of feeding and heat application. The feed rate generally is set to yield a flow occupying roughly 8–12%, by volume, of the tube (i.e., the kiln portion) of the rotary calcination apparatus. The maximum temperature exposure within the apparatus is selected to keep the viscosity of the binding materials in a liquid state at a viscosity of at least about 1,000 poise. This avoids excessive flow of the binding material onto the surface of the tube and loss of binding material from the surface of the abrasive grain.

A rotary calcination apparatus of the type illustrated in FIG. 1 may be used to carry out the agglomeration process for agglomerating and firing the agglomerates in a single process step. As shown in FIG. 1, a feed hopper (10) containing the feedstock (11) mixture of binding materials and abrasive grain is fed into a means (12) for metering the mixture into a hollow heating tube (13). The tube (13) is positioned at an incline angle (14) of approximately 0.5–5.0 degrees such that the feedstock (11) can be gravity fed through the hollow tube (13). Simultaneously, the hollow tube (13) is rotated in the direction of the arrow (a) at a controlled rate of speed to tumble the feedstock (11) and the heated mix (18) as they pass along the length of the hollow tube.

A portion of the hollow tube (13) is heated. In one embodiment, the heating portion may comprise three heating zones (15, 16, 17) having a length dimension (d1) of 60 inches (152 mm) along the length (d2) of 120 inches (305 mm) of the hollow tube (13). The heating zones permit the operator to control the processing temperature and to vary it as needed to sinter the agglomerates. In other models of the apparatus, the hollow tube may only comprise one or two heating zones, or it may comprise more than three heating zones. Although not illustrated in FIG. 1, the apparatus is equipped with a heating device and mechanical, electronic and temperature control and sensing devices operative for carrying out the thermal process. As can be seen in the cross-sectional view of the hollow tube (13), the feedstock (11) is transformed to a heated mix (18) within the tube and it exits the tube and is collected as agglomerate granules (19). The wall of the hollow tube has an inner diameter dimension (d3) which may range from 5.5 to 30 inches (14–76 mm) and a diameter (d4) which may range from 6 to 36 inches (15–91 mm), depending upon the model and the type of material used to construct the hollow tube (e.g., refractory metal alloy, refractory brick, silicon carbide, mullite).

The incline angle of the tube may range from 0.5 to 5.0 degrees and the rotation of the tube may operate at 0.5 to 10 rpm. The feed rate for a small scale rotary calciner may range from about 5 to 10 kg/hour, and an industrial production scale feed rate may range from about 227 to 910 kg/hour. The rotary calciner may be heated to a sintering temperature of 800 to 1400° C., and the feed material may be heated at a rate of up to 200° C./minute as the feedstock enters the heated zone. Cooling occurs in the last portion of the tube as the feedstock moves from a heated zone to an unheated zone. The product is cooled, e.g., with a water cooling system, to room temperature and collected.

Suitable rotary calcination machines may be obtained from Harper International, Buffalo, N.Y., or from Alstom Power, Inc., Applied Test Systems, Inc., and other equipment manufacturers. The apparatus optionally may be fitted with electronic, in-process control and detection devices, a cooling system, various designs of feed apparatus and other optional devices.

When agglomerating abrasive grain with lower temperature curing (e.g., about from about 145 to about 500° C.) binding materials, an alternative embodiment of this rotary kiln apparatus may be used. The alternative embodiment, a rotary dryer, is equipped to supply heated air to the discharge end of the tube to heat the abrasive grain mixture, cure the binding material, bonding it to the grain, and thereby agglomerate the abrasive grain as it is collected from the apparatus. As used herein, the term "rotary calcination kiln" includes such rotary dryer devices.

In a third embodiment of the process useful herein for making agglomerates, a mixture of the abrasive grain, binding materials and an organic binder system is fed into an oven, without pre-agglomeration and heated. The mixture is heated to a temperature high enough to cause the binding material to melt, flow and adhere to the grain, then cooled to make a composite. The composite is crushed and screened to make the sintered agglomerates.

In the fourth embodiment, the agglomerates are not sintered before making the abrasive tool, rather the "green" agglomerates are molded with bond material to form a tool body and the body is fired to form the abrasive tool. In a preferred method of carrying out this process, a high viscosity (when melted to form a liquid) vitrified binding material is used to agglomerate grain in the green state. The green agglomerates are oven-dried and mixed with a second, preferably lower viscosity, vitrified bond composition and molded into the form of a green abrasive tool. This green tool is fired at a temperature that is effective to fuse, but to avoid flow of, the high viscosity vitrified binding material. The firing temperature is selected to be sufficiently high to fuse the binding material composition into a glass; thereby agglomerating the grain, and to cause the bond composition to flow, bond the agglomerates and form the tool. It is not essential to select different viscosity materials and materials with different fusing or melting temperatures to carry out this process. Other combinations of binding materials and bond materials known in the art may be used in this technique for making abrasive tools from green state agglomerates.

Abrasive Tools

The bonded abrasive tools of the invention include abrasive grinding wheels, segmented wheels, discs, hones, stones and other monolithic, or segmented, shaped abrasive composites. The abrasive tools of the invention comprise about 5 to 75 volume %, preferably 10 to 60 volume %, most preferably 20 to 52 volume % abrasive grain agglomerates.

In a preferred embodiment, vitrified bonded abrasive tools comprise about 3 to 25 volume %, more preferably 4 to 20 volume %, and most preferably 5 to 19 volume % bond. Together with the abrasive grain agglomerates and the bond, these tools comprise about 35 to 80 volume % porosity, this porosity including at least 30 volume % of interconnected porosity, preferably 55 to 80 volume % porosity, this porosity including at least 50 volume % interconnected porosity. The vitrified bonded abrasive tools may comprise 35 to 52 volume % sintered agglomerates, 3 to 13 volume % vitrified bond and 35 to 70 volume % porosity.

The amount of interconnected porosity is determined by measuring the fluid permeability of the tool according to the method of U.S. Pat. No. 5,738,696. As used herein, Q/P=the fluid permeability of an abrasive tool, where Q means flow rate expressed as cc of air flow, and P means differential pressure. The term Q/P represents the pressure differential measured between the abrasive tool structure and the atmosphere at a given flow rate of a fluid (e.g., air). This relative permeability Q/P is proportional to the product of the pore volume and the square of the pore size. Larger pore sizes are preferred. Pore geometry and abrasive grain size are other factors affecting Q/P, with larger grit size yielding higher relative permeability.

The abrasive tools of the invention are characterized by higher fluid permeability values than comparable prior art tools. As used herein, "comparable prior art tools" are those tools made with the same abrasive grain and bond materials at the same porosity and bond volume percentages as those of the invention. In general, abrasive tools of the invention have fluid permeability values of about 30 to 100% higher than the values of comparable prior art abrasive tools. The abrasive tools preferably are characterized by fluid permeability values at least 10% higher, more preferably at least 30% higher, than those of comparable prior art tools.

Exact relative fluid permeability parameters for particular agglomerate sizes and shapes, bond types and porosity levels may be determined by the practitioner by applying D'Arcy's Law to empirical data for a given type of abrasive tool.

The porosity within the abrasive wheel arises from the open spacing provided by the natural packing density of the tool components, particularly the abrasive agglomerates, and, optionally, by adding conventional pore inducing media. Suitable pore inducing media includes, but is not limited to, hollow glass spheres, ground walnut shells, hollow spheres or beads of plastic material or organic compounds, foamed glass particles, bubble mullite and bubble alumina, and combinations thereof. The tools may be manufactured with open-cell porosity inducers, such as beads of naphthalene, or other organic granules, which burn out during firing of the tool to leave void spaces within the tool matrix, or they may be manufactured with closed cell, hollow pore inducing media (e.g., hollow glass spheres). Preferred abrasive tools of the invention either do not contain added pore inducer media, or contain a minor amount of added pore inducer media effective to yield an abrasive tool with a porosity content of which at least 30%, by volume is interconnected porosity.

The bonded abrasive tools of the invention have a porous structure. In this structure, the average diameter of the sintered agglomerates is no greater than an average dimension of the interconnected porosity when the interconnected porosity is measured at a point of a maximum opening.

The finished tools optionally contain added secondary abrasive grains, fillers, grinding aids and pore inducing media, and combinations of these materials. The total volume % abrasive grain in the tools (agglomerated and non-agglomerated grain) may range from about 34 to about 56 volume %, more preferably from about 36 to about 54 volume %, and most preferably from about 36 to about 46 volume % of the tool. The bonded abrasive tools preferably have a density of less than 2.2 g/cc.

When an abrasive grain is used in combination with the abrasive agglomerates, the agglomerates preferably provide from about 5 to about 100 volume % of the total abrasive grain of the tool and more preferably from about 30 to about 70 volume % of the total abrasive in the tool. When such secondary abrasive grains are used, these abrasive grains preferably provide from about 0.1 to about 95 volume % of the total abrasive grain of the tool, and more preferably, from about 30 to about 70 volume %. Suitable secondary abrasive grains include, but are not limited to, various aluminum oxides, sol gel alumina, sintered bauxite, silicon carbide, alumina-zirconia, aluminoxynitride, ceria, boron suboxide, cubic boron nitride, diamond, flint and garnet grains, and combinations thereof.

The abrasive tools of the present invention preferably are bonded with a vitreous bond. Any of the various bonds known in the art of making abrasive tools may be selected for use herein. Examples of suitable bonds may be found in U.S. Pat. Nos. 4,543,107; 4,898,597; 5,203,886; 5,401,284; 5,536,283; 5,095,665; 5,863,308; and 5,094,672, which are hereby incorporated by reference.

After firing, these vitreous bond compositions preferably include, but are not limited to a combination of the following oxides: $SiO_2$, $Al_2O_3$, $Na_2O$, $Li_2O$, and $B_2O_3$. Other oxides, such as $K_2O$, ZnO, $ZrO_2$, and alkaline earth oxides, such as CaO, MgO and BaO, may be present. Cobalt oxide (CoO)

and other color sources may be included where bond color is desirable. Other oxides, such as $Fe_2O_3$, $TiO_2$ and $P_2O_5$, and other compounds existing as impurities in the raw materials may be included in the bond. Frits may be used in addition to raw (or unfired) bond materials, or in lieu of raw bond materials. The raw materials for the bond may include clay, kaolin, alumina, lithium carbonate, borax pentahydrate or boric acid, soda ash, flint and wollastonite, and such other bond materials as are known in the art. The vitrified bond may be a glassy material or a ceramic material, with or without amorphous regions.

Organic binders are preferably added to powdered bond components, fritted or raw, as molding or processing aids. These binders may include dextrins, starch, animal protein glue and other types of glue, a liquid component, such as water, viscosity or pH modifiers and mixing aids. Use of binders improves wheel uniformity and the structural quality of the pre-fired or green pressed wheel and the fired wheel. Because the binders are burned out during firing, they do not become part of the finished bond or abrasive tool.

An inorganic adhesion promoter may be added to the mixture to improve adhesion of glass bonds to the abrasive grain agglomerates as needed during mixing and molding processes. The inorganic adhesion promoter may be used with or without an organic binder in preparing the agglomerates.

For some of the agglomerates, the abrasive tool may be made without added bond material, provided sufficient binder material is present in the tool to yield appropriate mechanical strength properties in the abrasive tool during manufacturing of the tool and use of the tool in grinding operations. For example, an abrasive tool may be constructed from at least 70 volume % agglomerates, having a binding material content of at least 5 volume % of the agglomerate.

The density and hardness of the abrasive tools are determined by the selection of the agglomerates, type of bond and other tool components, the porosity content, together with the size and type of mold and selected pressing process.

Abrasive wheels may be molded and pressed by any means known in the art, including hot, warm and cold pressing techniques. Care must be taken in selecting a molding pressure for forming the green wheels to avoid crushing an excessive amount of the abrasive grain agglomerates (e.g., more than 50%, by weight, of the agglomerates) and to preserve the three-dimensional structure of the agglomerates. The appropriate maximum applied pressure for making the wheels of the invention depends upon the shape, size, thickness and bond component of the abrasive wheel, and upon the molding temperature. In common manufacturing processes, the maximum pressure may range from about 3,100 to 20,000 lbs/sq. in (218 to 1,406 Kg/sq. cm). Molding and pressing are preferably carried out at about 775 to 1,550 Kg/sq. cm, more preferably at 465 to 1,085 Kg/sq. cm. The agglomerates of the invention have sufficient mechanical strength to withstand the molding and pressing steps carried out in typical commercial manufacturing processes for making abrasive tools.

The abrasive wheels may be fired by methods known to those skilled in the art. The firing conditions are primarily determined by the actual bond and abrasives used, and by the type of binding material contained in the abrasive grain agglomerate. Depending upon the chemical composition of the selected bond, a vitrified bond may be fired at 600 to 1250° C., preferably 850 to 1200° C., to provide the mechanical properties necessary for grinding metals, ceramics or other materials. The vitrified bonded body further may also be impregnated after firing in a conventional manner with a grinding aid, such as sulfur, or with a vehicle, such as epoxy resin, to carry a grinding aid into the pores of the wheel.

Selection of a suitable vitrified bond will depend upon which agglomeration process is in use and whether a melt or fuse temperature or viscosity differential must be maintained between the bond and the binding material of the agglomerate.

In making a vitrified bonded grinding wheel or other abrasive tool from the abrasive agglomerates, one of several general techniques may be selected. In the first one, a relatively higher firing temperature (e.g., fuses at above about 1,000° C.), vitrified binding material is applied to agglomerate the grain. Then a second, lower firing temperature (e.g., fuses at about 650 to 975° C.), powdered, vitrified bond composition is mixed with the grain agglomerates and molded into the form of an abrasive tool. The green stage tool is fired at the lower firing temperature of the second bond material to create a finished abrasive tool. In a preferred embodiment, the vitrified bond has a bond firing temperature at least 150° C. lower than the binding material melting or fusing temperature.

In the second technique, viscosity differentials between the melted or fused glasses in their liquid state are exploited to use the same firing temperature for making the agglomerate and firing the abrasive wheel. A high viscosity vitrified binding material is used to agglomerate grain in a first firing step. Then the fired agglomerates are mixed with a second, lower viscosity vitrified bond composition and molded into the form of a green abrasive tool. The molded tool may be fired at about the same temperature as the temperature of the first firing step used to make the agglomerates, because, when in a hot, liquid state, the binding material will not thin excessively and run off the grain. The original three-dimensional configuration of the agglomerate thus can be maintained.

In a preferred embodiment of this technique, the viscosity of the vitrified bond at the binding material melting temperature is at least 33% lower than the viscosity of the binding material at its melting temperature. Thus, when the viscosity of the binding material is about 345 to 55,300 poise at 1180° C., the preferred vitrified bond material is characterized by a viscosity of about 30 to 37,000 poise at 1180° C.

In the third technique, an intermediate firing temperature (e.g., about 850–975° C.) binding material is used to agglomerate grain, but agglomeration is done at a temperature higher than the fuse or melt temperature of the binding material (e.g., 1000–1200° C.). The agglomerates are mixed with the same binding material being utilized as the vitrified bond composition and the mixture is molded into the form of a green abrasive tool. The green tool is fired at a lower temperature (e.g., about 850–975° C.) than temperature used to melt the binding material to agglomerate the grain. The lower temperature is effective to bond the agglomerates together. This process maintains the three-dimensional structure of the agglomerates because the first layer of binding material does not flow at the firing temperature of the abrasive tool.

In a fourth technique, the same composition is used as the binding material and the bond for the wheel and the agglomeration and the wheel are carried out at the same temperature. It is theorized that because the binding material has been fused to form a glass adhered to the abrasive grain during agglomeration, the properties of the binding materials have been altered. Thus, the fused binding material within the sintered agglomerates flows at a higher temperature than the unfused bond material, and the agglomerates retain their shape as the wheel is being fired. In a preferred embodiment the composition used for the binding material and the bond contain some raw materials and do not consist of a fritted glass composition.

In a fifth technique for making vitrified abrasive tools, the tool is made without added bond material. The agglomerates are packed into a tool mold, pressed and fired at a temperature in the range of about 500 to 1400° C. to form the tool. The binding materials used to make the agglomerates comprise a vitrified bond composition and the binding material is present in a sufficient amount in the agglomerate (e.g., about 5 to 15 volume % of the agglomerate) to bond the agglomerates together in the finished vitrified abrasive tool.

The agglomerates may be bonded with all known types of bonds, such as organic or resin bonds and metal bonds, known in the art of manufacturing bonded abrasive tools. The volume percent range for agglomerates suitable for use in vitrified abrasive tools is also satisfactory for metal and organic bonded tools. The organic and metal bonded tools usually comprise higher volume percentages of bond and lower volume percentages of porosity than vitrified bonded tools, and the abrasive grain content may be higher. The organic and metal bonded tools may be mixed, molded and cured or sintered according to various processing methods, and with various proportions of abrasive grain or agglomerate, bond and porosity components as are known in the art. The agglomerates of the invention may be used in single layer metal bonded tools, as well as in multi-layer, three-dimensional structures, monolithic tools and segmented matrix abrasive tools as are known in the art.

Grinding Applications

The abrasive tools of the invention include abrasive wheels, discs, hones and stones and sticks and they are particularly effective in grinding applications having large surface area contact between the abrasive tool and the workpiece. Such applications or grinding operations include, but are not limited to, creepfeed and other precision surface grinding, porous toolroom grinding operations, internal diameter grinding operations and in fine surface grinding of ceramics and other brittle workpieces.

Fine grinding or polishing operations using micron or submicron sized abrasive grain will benefit from use of tools made with the agglomerates of the invention. Relative to conventional superfinishing or polishing tools and systems, the tools of the invention made with such fine grit abrasive agglomerates will erode at lower grinding forces with little or no surface damage to the workpiece during precision finishing operations (e.g., to yield mirror finishes on glass and ceramic components). Tool life remains satisfactory due to the agglomerated structures, particularly in single layer tools, but also in three-dimensional matrix and slurry tools.

In precision shaped profile grinding, the friablity of the agglomerates contributes to fewer dressing cycles. Due to the interconnected porosity of the tools, coolant supply and debris removal are enhanced resulting in cooler grinding operations, less thermal damage to the workpiece and less grinding machine wear. Because smaller grit size abrasive grains in agglomerated form give the grinding efficiency of a larger grit size grain, but leave a smoother surface finish, the ground work part quality often improves significantly.

The following Examples are provided by way of illustration of the invention, and not by way of limitation.

EXAMPLE 1

A series of agglomerated abrasive grain samples were prepared in a rotary calcination apparatus (electric fired model # HOU-5D34-RT-28, 1,200° C. maximum temperature, 30 KW input, equipped with a 72" (183 cm) long, 5.5" (14 cm) inner diameter refractory metal tube, manufactured by Harper International, Buffalo, N.Y.). The refractory metal tube was replaced with a silicon carbide tube of the same dimensions, and the apparatus was modified to operate at a maximum temperature of 1,550° C. The process of agglomeration was carried out under atmospheric conditions, at a hot zone temperature control set point of 1,180° C., with an apparatus tube rotation rate of 9 rpm, a tube incline angle of 2.5 to 3 degrees, and a material feedrate of 6–10 kg/hour. The apparatus used was substantially identical to the apparatus illustrated in FIG. 1. The yield of usable free-flowing granules (defined as −12 mesh to pan) was 60 to 90% of the total weight of the feedstock before calcination.

The agglomerate samples were made from a simple mixture of abrasive grain, binding material and water mixtures described in Table 1-1. The vitrified bond binding material compositions used to prepare the samples are listed in Table 2. Samples were prepared from three types of abrasive grains: fused alumina 38A, fused alumina 32A and sintered sol gel alpha-alumina Norton SG grain, obtained from Saint-Gobain Ceramics & Plastics, Inc., Worcester, Mass., USA, in the grit sizes listed in Table 1.

After agglomeration in the rotary calcination apparatus, the agglomerated abrasive grain samples were screened and tested for loose packing density (LPD), size distribution and agglomerate strength. These results are shown in Table 1.

TABLE 1-1

Agglomerated Granule Characteristics

| Sample No. grain liquid binding material | Weight lbs (Kg) of mix | Binding material Weight % (on grain basis) | Volume % of binding material[a] | LPD g/cc −12/ pan | Average size distribution microns | Average size distribution mesh size | Average % relative density | pressure at 50% crushed fraction MPa |
|---|---|---|---|---|---|---|---|---|
| 1 |  | 2.0 | 3.18 | 1.46 | 334 | −40/+50 | 41.0 | 0.6 ± 0.1 |
| 60 grit | 30.00 (13.6) |  |  |  |  |  |  |  |
| 38A | 0.60 |  |  |  |  |  |  |  |
| water | (0.3) |  |  |  |  |  |  |  |
| A binding material | 0.64 (0.3) |  |  |  |  |  |  |  |

TABLE 1-1-continued

Agglomerated Granule Characteristics

| Sample No. grain liquid binding material | Weight lbs (Kg) of mix | Binding material Weight % (on grain basis) | Volume % of binding material[a] | LPD g/cc −12/pan | Average size distribution microns | Average size distribution mesh size | Average % relative density | pressure at 50% crushed fraction MPa |
|---|---|---|---|---|---|---|---|---|
| 2 |  | 6.0 | 8.94 | 1.21 | 318 | −45/+50 | 37.0 | 0.5 ± 0.1 |
| 90 grit | 30.00 (13.6) | | | | | | | |
| 38A water | 0.90 (0.4) | | | | | | | |
| E binding material | 1.99 (0.9) | | | | | | | |
| 3 |  | 10.0 | 13.92 | 0.83 | 782 | −20/+25 | 22.3 | 2.6 ± 0.2 |
| 120 grit | 30.00 (13.6) | | | | | | | |
| 38A water | 1.20 (0.5) | | | | | | | |
| C binding material | 3.41 (1.5) | | | | | | | |
| 4 |  | 6.0 | 8.94 | 1.13 | 259 | −50/+60 | 31.3 | 0.3 ± 0.1 |
| 120 grit | 30.00 (13.6) | | | | | | | |
| 32A water | 0.90 (0.4) | | | | | | | |
| A binding material | 1.91 (0.9) | | | | | | | |
| 5 |  | 10.0 | 14.04 | 1.33 | 603 | −25/+30 | 37.0 | 3.7 ± 0.2 |
| 60 grit | 30.00 (13.6) | | | | | | | |
| 32A water | 1.20 (0.5) | | | | | | | |
| E binding material | 3.31 (1.5) | | | | | | | |
| 6 |  | 2.0 | 3.13 | 1.03 | 423 | −40/+45 | 28.4 | 0.7 ± 0.1 |
| 90 grit | 30.00 (13.6) | | | | | | | |
| 32A water | 0.60 (0.3) | | | | | | | |
| C binding material | 0.68 (0.3) | | | | | | | |
| 7 |  | 10.0 | 14.05 | 1.20 | 355 | −45/+50 | 36.7 | 0.5 ± 0.1 |
| 90 grit | 30.00 (13.6) | | | | | | | |
| SG water | 1.20 (0.5) | | | | | | | |
| A binding material | 3.18 (1.4) | | | | | | | |
| 8 |  | 2.0 | 3.15 | 1.38 | 120 | −120/+140 | 39.1 | — |
| 120 grit | 30.00 (13.6) | | | | | | | |
| SG water | 0.60 (0.3) | | | | | | | |
| E binding material | 0.66 (0.3) | | | | | | | |
| 9 |  | 6.0 | 8.87 | 1.03 | 973 | −18/+20 | 27.6 | — |
| 60 grit | 30.00 (13.6) | | | | | | | |
| SG water | 0.90 (0.4) | | | | | | | |
| C binding material | 2.05 (0.9) | | | | | | | |

[a]The volume % binding material is a percentage of the solid material within the granule (i.e., binding material and grain) after firing, and does not include the volume % porosity.

The volume % binding material of the fired agglomerates was calculated using the average LOI (loss on ignition) of the binding material raw materials.

The sintered agglomerates were sized with U.S. standard testing sieves mounted on a vibrating screening apparatus (Ro-Tap; Model RX-29; W.S. Tyler Inc. Mentor, Ohio). Screen mesh sizes ranged from 18 to 140, as appropriate for different samples. The loose packed density of the sintered agglomerates (LPD) was measured by the American National Standard procedure for Bulk Density of Abrasive Grains.

The initial average relative density, expressed as a percentage, was calculated by dividing the LPD ($\rho$) by a theoretical density of the agglomerates ($\rho_0$), assuming zero porosity. The theoretical density was calculated according to the volumetric rule of mixtures method from the weight percentage and specific gravity of the binding material and of the abrasive grain contained in the agglomerates.

The strength of the agglomerates was measured by a compaction test. The compaction tests were performed using one inch (2.54 cm) in diameter lubricated steel die on an Instron® universal testing machine (model MTS 1125, 20,000 lbs (9072 Kg)) with a 5 gram sample of agglomerate. The agglomerate sample was poured into the die and slightly leveled by tapping the outside of the die. A top punch was inserted and a crosshead lowered until a force ("initial position") was observed on the recorder. Pressure at a constant rate of increase (2 mm/min) was applied to the sample up to a maximum of 180 MPa of pressure. The volume of the agglomerate sample (the compacted LPD of the sample), observed as a displacement of the crosshead (the strain), was recorded as the relative density as a function of the log of the applied pressure. The residual material was then screened to determine the percent crush fraction. Different pressures were measured to establish a graph of the relationship between the log of the applied pressure and the percent crush fraction. Results are reported in Table 1 as the log of the pressure at the point where the crush fraction equates to 50 weight percent of the agglomerate sample. The crush fraction is the ratio of the weight of crushed particles passing through the smaller screen to the weight of the initial weight of the sample.

These agglomerates had LPD, size distribution, and molding strength and granule size retention characteristics suitable for use in the commercial manufacture of abrasive grinding wheels. The finished, sintered agglomerates had three-dimensional shapes varying among triangular, spherical, cubic, rectangular and other geometric shapes. Agglomerates consisted of a plurality of individual abrasive grits (e.g., 2 to 20 grits) bonded together by glass binding material at grit to grit contact points.

Agglomerate granule size increased with an increase in amount of binding material in the agglomerate granule over the range from 3 to 20 weight % of the binding material.

Adequate compaction strength was observed for all samples 1–9, indicating that the glass binding material had matured and flowed to create an effective bond among the abrasive grains within the agglomerate. Agglomerates made with 10 weight % binding material had significantly higher compaction strength than those made with 2 or 6 weight % binding material.

Lower LPD values were an indicator of a higher degree of agglomeration. The LPD of the agglomerates decreased with increasing weight % binding material and with decreasing abrasive grit size. Relatively large differences between 2 and 6 weight % binding material, compared with relatively small differences between 6 and 10 weight % binding material indicate a weight % binding material of less than 2 weight % may be inadequate for formation of agglomerates. At the higher weight percentages, above about 6 weight %, the addition of more binding material may not be beneficial in making significantly larger or stronger agglomerates.

As suggested by agglomerate granule size results, binding material C samples, having the lowest molten glass viscosity at the agglomerating temperature, had the lowest LPD of the three binding materials. The abrasive type did not have a significant effect upon the LPD.

TABLE 2

Binding Material used in the Agglomerates

| Fired Composition Elements[b] | A Binding material wt % (A-1 binding material)[a] | B Binding material wt % | C Binding material wt % | D Binding material wt % | E Binding material wt % | F Binding material wt % |
|---|---|---|---|---|---|---|
| glass formers ($SiO_2 + B_2O_3$) | 69 (72) | 69 | 71 | 73 | 64 | 68 |
| $Al_2O_3$ | 15 (11) | 10 | 14 | 10 | 18 | 16 |
| alkaline earth RO (CaO, MgO) | 5–6 (7–8) | <0.5 | <0.5 | 1–2 | 6–7 | 5–6 |
| Alkali $R_2O$ ($Na_2O$, $K_2O$, $Li_2O$) | 9–10 (10) | 20 | 13 | 15 | 11 | 10 |
| Spec. Gravity g/cc | 2.40 | 2.38 | 2.42 | 2.45 | 2.40 | 2.40 |
| Estimated Viscosity (Poise) at 1180° C. | 25,590 | 30 | 345 | 850 | 55,300 | 7,800 |

[a]The A-1 binding material variation set forth in parentheses was used for the samples of Example 2.
[b]Impurities (e.g., $Fe_2O_3$ and $TiO_2$) are present at about 0.1–2%.

EXAMPLE 2

Additional samples of agglomerates were made utilizing various other processing embodiments and feedstock materials.

A series of agglomerates (sample nos. 10–13) were formed at different sintering temperatures, ranging from 1100 to 1250° C., utilizing a rotary calcination apparatus (model #HOU-6D60-RTA-28, equipped with a 120 inch (305 cm) long, 5.75 inch (15.6 cm) inner diameter, 3/8 inch (0.95 cm) thick, mullite tube, having a 60 inch (152 cm) heated length with three temperature control zones. The apparatus was manufactured by Harper International, Buffalo, N.Y.). A Brabender feeder unit with adjustable control volumetric feed-rate was used to meter the abrasive grain and binding material mixture into the heating tube of the rotary calcination apparatus. The process of agglomeration was carried under atmospheric conditions, with an apparatus tube rotation rate of 4 rpm, a tube incline angle of 2.5 degrees, and a feed rate of 8 kg/hour. The apparatus used was substantially identical to the apparatus illustrated in FIG. 1. Temperature selections and other variables utilized to make these agglomerates are set forth in Table 2-1.

All samples contained a mixture, on a weight % basis, of 89.86% abrasive grain (60 grit 38A alumina grain obtained from Saint-Gobain Ceramics & Plastics, Inc.), 10.16% binder mixture (6.3 wt % AR30 liquid protein binder, 1.0% Carbowax® 3350 PEG and 2.86% of binding material A). This mixture yielded 4.77 volume % binding material and 95.23 volume % grain in the sintered agglomerate granule. The calculated theoretical density of the agglomerate granules (assuming no porosity) was 3.852 g/cc.

Prior to placing the mixture into the feeder unit, green stage agglomerates were formed by simulated extrusion. To prepare extruded agglomerates, the liquid protein binder was heated to dissolve the Carbowax® 3350 PEG. Then the binding material was added slowly while stirring the mixture. Abrasive grains were added to a high shear mixer (44 inch (112 cm) diameter) and the prepared binding material-binder mixture was slowly added to the grain in the mixer. The combination was mixed for 3 minutes. The mixed combination was wet-screened through a 12 mesh box screen (US standard sieve size) onto trays in a layer at a maximum depth of one inch (2.5 cm) to form wet, green (unfired), extruded agglomerates. The layer of extruded agglomerates was oven dried at 90° C. for 24 hours. After drying, the agglomerates were screened again using a 12 to 16 mesh (U.S. standard sieve size) box screen.

It was observed during rotary calcination that the agglomerates made in the green state appeared to break apart when heated, and, then, re-formed as they tumbled out of the exit end of the heated portion of the rotary calciner tube. The larger size of the agglomerated granules made in the green state, relative to that of the agglomerated granules after firing, was readily apparent upon visual inspection of the samples.

After firing, the agglomerated particle sizes were observed to be sufficiently uniform for commercial purposes, with a size distribution over a range of about 500–1200 microns. The size distribution measurements are set forth in Table 2-2, below. Yield, size, crush strength and LPD were acceptable for commercial use in making grinding wheels.

TABLE 2-2

Particle size distribution for fired agglomerates

| Sieve # ASTM-E | Sieve # ISO 565 μm | Weight % on Screen Sample No. | | | |
|---|---|---|---|---|---|
| | | 10 | 11 | 12 | 13 |
| −35 | −500 | 41.05 | 17.49 | 11.57 | 14.31 |
| 35 | 500 | 22.69 | 17.86 | 14.56 | 17.69 |
| 30 | 600 | 18.30 | 24.34 | 21.27 | 26.01 |
| 25 | 725 | 12.57 | 21.53 | 24.89 | 23.06 |
| 20 | 850 | 3.43 | 13.25 | 16.17 | 12.43 |
| 18 | 1000 | 1.80 | 4.58 | 10.09 | 5.97 |
| 16 | 1180 | 0.16 | 0.95 | 1.44 | 0.54 |

EXAMPLE 3

Agglomerates (sample nos. 14–23) were prepared as described in Example 2, except the temperature was maintained constant at 1000° C., and a model #KOU-8D48-RTA-20 rotary calciner apparatus, equipped with a 108 inch (274 cm) long, 8 inch (20 cm) inner diameter, fused silica tube, having a 48 inch (122 cm) heated length with three temperature control zones, was used. The apparatus was manufactured by Harper International, Buffalo, N.Y. Various methods were examined for preparation of the pre-fired mixture of grain and binding material. The process of agglomeration was carried under atmospheric conditions, with an apparatus tube rotation rate of 3 to 4 rpm, a tube incline angle of 2.5 degrees, and a feed rate of 8 to 10 kg/hour. The apparatus used was substantially identical to the apparatus illustrated in FIG. 1.

All samples contained 30 lbs (13.6 Kg) abrasive grain (the same grain used in Example 2, except that sample 16 contained 25 lbs (11.3 Kg) of 70 grit Norton SG® sol gel alumina grain, obtained from Saint-Gobain Ceramics and Plastics, Inc.) and 0.9 lbs (0.41 Kg) binding material A (yielding 4.89 volume % binding material in the sintered agglomerate). The binding material was dispersed in different binder systems prior to addition to the grain. The binder system of Example 2 ("Binder 2") was used for some samples and other samples were made using AR30 liquid protein binder ("Binder 3") in the weight percentages listed below in Table 3. Sample 20 was used to prepare agglomerates in the green, unfired state by the simulated extrusion method of Example 2.

The variables tested and the test results of the tests are summarized below in Table 3.

TABLE 2-1

| Sample No. | Sintering Temp.[a] ° C. | % Yield −12 mesh | Ave. size μm | LPD g/cc −12 mesh | pressure at 50% crushed fraction MPa | % yield −16/+35 mesh | Ave. agglom size μm | LPD g/cc −16/+35 mesh |
|---|---|---|---|---|---|---|---|---|
| (10) | 1100 | n/a[b] | n/a | n/a | n/a | n/a | 536 | n/a |
| (11) | 1150 | 97.10 | 650 | 1.20 | 13 ± 1 | 76.20 | 632 | 0.95 |
| (12) | 1200 | 96.20 | 750 | 1.20 | 9 ± 1 | 87.00 | 682 | 1.04 |
| (13) | 1250 | 96.60 | 675 | 1.25 | 8 ± 1 | 85.20 | 641 | 1.04 |

[a]Temperature of rotary calciner controller set point (for all 3 zones).
[b]"n/a" indicates no measurement was made.

TABLE 3

Green stage binder treatments

| Sample No. | Mix Treatment | wt % binder (as % of grain wt) | % Yield −12 mesh screen | LPD g/cc |
|---|---|---|---|---|
| 14 | Binder 3 | 2.0 | 100 | 1.45 |
| 15 | Binder 3 | 1.0 | 100 | 1.48 |
| 16 | Binder 3; SG grain | 4.0 | 92 | 1.38 |
| 17 | Binder 3 | 4.0 | 98 | 1.44 |
| 18 | Binder 2 | 6.3 | 90 | 1.35 |
| 19 | Binder 3 | 8.0 | 93 | 1.30 |
| 20 | Binder 2; simulated extrusion | 6.3 | 100 | 1.37 |
| 21 | Binder 3 | 3.0 | 100 | 1.40 |
| 22 | Binder 3 | 6.0 | 94 | 1.44 |
| 23 | Binder 2 | 4.0 | 97 | 1.54 |

These results confirm that green stage agglomeration is not needed to form an acceptable quality and yield of sintered agglomerated granules (compare samples 18 and 20). As the wt % of Binder 3 used in the initial mix increased from 1 to 8%, the LPD showed a trend towards a moderate decrease, indicating that the use of a binder has a beneficial, but not essential, effect upon the agglomeration process. Thus, rather unexpectedly, it did not appear necessary to pre-form a desired agglomerate granule shape or size prior to sintering it in a rotary calciner. The same LPD was achieved merely by feeding a wet mixture of the agglomerate components into the rotary calciner and tumbling the mixture as it passes through the heated portion of the apparatus.

EXAMPLE 4

Agglomerates (sample nos. 24–29) were prepared as described in Example 2, except the temperature was maintained constant at 1200° C. and various methods were examined for preparation of the pre-fired mixture of grain and binding material. All samples (except samples 28–29) contained a mixture of 300 lbs (136.4 Kg) abrasive grain (same grain as Example 2: 60 grit 38A alumina) and 9.0 lbs (4.1 Kg) of binding material A (yielding 4.89 volume % binding material in the sintered agglomerate).

Sample 28 (same composition as Example 2) contained 44.9 lbs (20.4 Kg) of grain and 1.43 lbs (0.6 Kg) of binding material A. The binding material was combined with the liquid binder mixture (37.8 wt % (3.1 lbs) of AR30 binder in water) and 4.98 lbs of this combination was added to the grain. The viscosity of the liquid combination was 784 CP at 22° C. (Brookfield LVF Viscometer).

Sample 29 (same composition as Example 2) contained 28.6 lbs (13 Kg) of grain and 0.92 lbs (0.4 Kg) of binding material A (yielding 4.89 volume % binding material in the sintered agglomerate). The binding material was combined with the liquid binder mixture (54.7 wt % (0.48 lbs) Duramax® resin B1052 and 30.1 wt % (1.456 lbs) Duramax resin B1051 resin in water) and this combination was added to the abrasive grain. The Duramax resins were obtained from Rohm and Haas, Philadelphia, Pa.

The process of agglomeration was carried under atmospheric conditions, with an apparatus tube rotation rate of 4 rpm, a tube incline angle of 2.5 degrees, and a feed rate of 8 to 12 kg/hour. The apparatus used was substantially identical to the apparatus illustrated in FIG. 1.

Sample 28 was pre-agglomerated, before calcination, in a fluidized bed apparatus made by Niro, Inc., Columbia, Md. (model MP-2/3 Multi-Processor™, equipped with a MP-1 size cone (3 feet (0.9 meter) in diameter at its widest width). The following process variables were selected for the fluidized bed process sample runs:
inlet air temperature 64–70° C.
inlet air flow 100–300 cubic meters/hour
granulation liquid flow rate 440 g/min
bed depth (initial charge 3–4 kg) about 10 cm
air pressure 1 bar
two fluid external mix nozzle 800 micron orifice The abrasive grain was loaded into the bottom apparatus and air was directed through the fluidized bed plate diffuser up and into the grain. At the same time, the liquid mixture of binding material and binder was pumped to the external mix nozzle and then sprayed from the nozzles through the plate diffuser and into the grain, thereby coating individual abrasive grits. Green stage agglomerates were formed during the drying of the binding material and binder mixture.

Sample 29 was pre-agglomerated, before calcination, in a low pressure extrusion process using a Benchtop Granulator™ made by LCI Corporation, Charlotte, N.C. (equipped with a perforated basket having 0.5 mm diameter holes). The mixture of grain, binding material and binder was manually fed into the perforated basket (the extruder screen), forced through the screen by rotating blades and collected in a receiving pan. The extruded pre-agglomerates were oven-dried at 90° C. for 24 hours and used as feed stock for the rotary calcination process.

The variables tested and the results of the tests are summarized below and in Tables 4-1 and 4-2. These tests confirm the results set forth in Example 3 are also observed at a higher firing temperature (1200 versus 1000° C.). These tests also illustrate that low-pressure extrusion and fluid bed pre-agglomeration may be used to make agglomerated granules, but an agglomeration step before rotary calcination is not necessary to make the agglomerates of the invention.

TABLE 4-1

Agglomerate characteristics

| Sample No. | Mix Treatment | wt % binder on grain wt % basis | % Yield −12 mesh screen | Average size μm | LPD g/cc |
|---|---|---|---|---|---|
| 24 | Binder 3 | 1.0 | 71.25 | 576 | 1.30 |
| 25 | Binder 3 | 4.0 | 95.01 | 575 | 1.30 |
| 26 | Binder 3 | 8.0 | 82.63 | 568 | 1.32 |
| 27 | Binder 2 | 7.2 | 95.51 | 595 | 1.35 |
| 28 | Binder 3 | 7.2 | 90.39 | n/a | n/a |
| 29 | Duramax resin | 7.2 | 76.17 | 600 | 1.27 |

TABLE 4-2

Particle size distribution for agglomerates

| Sieve # ASTM-E | Sieve # ISO 565 μm | Weight % on Screen Sample No. | | | | | |
|---|---|---|---|---|---|---|---|
| | | 24 | 25 | 26 | 27 | 28 | 29 |
| −40 | −425 | 17.16 | 11.80 | 11.50 | 11.50 | n/a | 11.10 |
| 40 | 425 | 11.90 | 13.50 | 14.00 | 12.50 | n/a | 12.20 |
| 35 | 500 | 17.30 | 20.70 | 22.70 | 19.60 | n/a | 18.90 |

TABLE 4-2-continued

Particle size distribution for agglomerates

| Sieve # ASTM-E | Sieve # ISO 565 μm | Weight % on Screen Sample No. | | | | | |
|---|---|---|---|---|---|---|---|
| | | 24 | 25 | 26 | 27 | 28 | 29 |
| 30 | 600 | 20.10 | 25.20 | 26.30 | 23.80 | n/a | 23.70 |
| 25 | 725 | 17.60 | 19.00 | 17.20 | 18.40 | n/a | 19.20 |
| 20 | 850 | 10.80 | 8.10 | 6.40 | 9.30 | n/a | 10.30 |
| 18 | 1000 | 3.90 | 1.70 | 1.60 | 3.20 | n/a | 3.60 |
| 16 | 1180 | 0.80 | 0.10 | 0.30 | 1.60 | n/a | 1.10 |

EXAMPLE 5

Additional agglomerates (sample nos. 30–37) were prepared as described in Example 3, except sintering was done at 1180° C., different types of abrasive grains were tested, and 30 lbs (13.6 Kg) of abrasive grain was mixed with 1.91 lbs (0.9 Kg) of binding material A (to yield 8.94 volume % binding material in the sintered agglomerate granules). Binder 3 of Example 3 was compared with water as a binder for green stage agglomeration. Samples 30–34 used 0.9 lbs (0.4 Kg) of water as a binder. Samples 35–37 used 0.72 lbs (0.3 Kg) of Binder 3. The variables tested are summarized below in Table 5.

The process of agglomeration was carried under atmospheric conditions, with an apparatus tube rotation rate of 8.5–9.5 rpm, a tube incline angle of 2.5 degrees, and a feed rate of 5–8 kg/hour. The apparatus used was substantially identical to the apparatus illustrated in FIG. 1.

After agglomeration, the agglomerated abrasive grain samples were screened and tested for loose packing density (LPD), size distribution and agglomerate strength. These results are shown in Table 5.

These results again demonstrate the utility of water as a temporary binder for the agglomerates in the rotary calcination process. Further, mixtures of grain types, grain sizes, or both, may be agglomerated by the process of the invention and these agglomerates can be coated at a temperature of 1180° C. in the rotary calciner. A significant increase in crush strength was observed when a high aspect ratio (i.e., ≧4:1), elongated abrasive grain was used in the agglomerates (sample 33).

EXAMPLE 6

Another series of agglomerates (sample nos. 38–45) was prepared as described in Example 3, except different sintering temperatures were used, and different types of abrasive grain grit sizes blends, different binding materials were tested. In some of the feedstock mixtures, walnut shell was used as an organic pore inducer filler material (walnut shell was obtained from Composition Materials Co., Inc., Fairfield, Conn., in US Sieve size 40/60). The variables tested are summarized below in Table 6. All samples contained a mixture of 30 lbs (13.6 Kg) abrasive grain and 2.5 wt % Binder 3, on grain weight basis, with various amounts of binding materials as shown in Table 6.

The process of agglomeration was carried under atmospheric conditions, with an apparatus tube rotation rate of 8.5–9.5 rpm, a tube incline angle of 2.5 degrees, and a feed rate of 5–8 kg/hour. The apparatus used was substantially identical to the apparatus illustrated in FIG. 1.

After agglomeration, the agglomerated abrasive grain samples were screened and tested for loose packing density (LPD), average size and agglomerate crush strength (see Table 6). The properties of all agglomerates were acceptable for use in manufacturing abrasive grinding wheels. These data appear to indicate the use of organic pore inducers, i.e., walnut shells, had no significant impact on agglomerate characteristics.

TABLE 5

| Sample No. | Abrasive grain | Binder | wt % binder on grain wt % basis | Average size μm | LPD g/cc | pressure at 50% crushed fraction MPa |
|---|---|---|---|---|---|---|
| 30 | 60 grit 57A alumina | water | 3.0 | 479 | 1.39 | 1.2 ± 0.1 |
| 31 | 60 grit 55A alumina | water | 3.0 | 574 | 1.27 | 2.5 ± 0.1 |
| 32 | 80 grit XG alumina | water | 3.0 | 344 | 1.18 | 0.4 ± 0.1 |
| 33 | 70 grit Targa ® sol gel alumina | water | 3.0 | 852 | 1.54 | 17 ± 1.0 |
| 34 | 70/30 wt % 60 grit 38A/60 grit Norton SG alumina | water | 3.0 | 464 | 1.31 | 1.1 ± 0.1 |
| 35 | 60 grit 38A alumina | Binder 3 | 2.4 | n/a | n/a | n/a |
| 36 | 60 grit Norton SG ® alumina | Binder 3 | 2.4 | n/a | n/a | n/a |
| 37 | 60/25/15 wt % 60 grit 38 A/ 120 grit Norton SG/ 320 grit 57A | Binder 3 | 2.4 | n/a | n/a | n/a |

TABLE 6

| Sample No. | Abrasive grain wt % mixture grit size grain type | Binding material | Vol % Fired Binding material[a] | Vol % Fired Pore Inducer | LPD g/cc | pressure at 50% crushed fraction MPa |
|---|---|---|---|---|---|---|
| 38 | 90/10 wt % 60 grit 38A alumina/ 70 grit Targa ® sol gel alumina | F | 5.18 | 0 | 1.14 | 11.5 ± 0.5 |
| 39 | 90/10 wt % 60 grit 38A alumina/ 70 grit Targa ® sol gel alumina | C | 7.88 | 2 | 1.00 | 11.5 ± 0.5 |
| 40 | 90/10 wt % 80 grit 38A alumina/ 70 grit Targa ® sol gel alumina | F | 5.18 | 2 | 1.02 | 10.5 ± 0.5 |
| 41 | 90/10 wt % 80 grit 38A alumina/ 70 grit Targa ® sol gel alumina | C | 7.88 | 0 | 0.92 | n/a |
| 42 | 50/50 wt % 60 grit 38A alumina/ 60 grit 32A alumina | F | 5.18 | 2 | 1.16 | 11.5 ± 0.5 |
| 43 | 50/50 wt % 60 grit 38A alumina/ 60 grit 32A alumina | C | 7.88 | 0 | 1.06 | n/a |
| 44 | 50/50 vol % 80 grit 38A alumina/ 60 grit 32A alumina | F | 5.18 | 0 | 1.08 | 8.5 ± 0.5 |
| 45 | 50/50 vol % 80 grit 38A alumina/ 60 grit 32A alumina | C | 7.88 | 2 | 1.07 | 11.5 ± 0.5 |

[a]Volume % is on the basis of total solids (grain, binding material and pore inducer) and does not include the porosity of the agglomerate.

EXAMPLE 7

Agglomerate samples 10–13 and 24–27 prepared according to Examples 2 and 4, respectively, were used to make grinding wheels (finished size: 20×1×8 inch) (50.8×2.54×20.3 cm). These wheels were tested in a creepfeed grinding operation against comparative wheels made without agglomerates, but containing pore inducer filler material.

To make the abrasive wheels, the agglomerates were added to a mixer along with a liquid binder and a powdered vitrified bond composition corresponding to Binding material C from Table 1-2. The wheels were then molded, dried, fired to a maximum temperature of 900° C., graded, finished, balanced and inspected according to commercial grinding wheel manufacturing techniques known in the art.

The composition of the wheels (including volume % abrasive, bond and porosity in the fired wheels), density, and modulus properties of the wheels are described in Table 7-1. Wheels were formulated to a modulus of elasticity corresponding to a standard wheel hardness grade between the D and E grades on the Norton Company hardness grade scale. Preliminary tests had established the wheels formulated from agglomerated grain with a volume % structure (i.e., volume % grain, bond and pores, to a total of 100%) identical to that of a comparative wheel made without agglomerated grain were in fact considerably lower in density, had a lower elastic modulus, and were softer than the comparative wheel. Thus, density and elastic modulus, more so than calculated volume % structure, were selected as the critical wheel hardness indicators for wheels made with agglomerated grain and tested in these grinding studies.

TABLE 7-1

| Abrasive Wheel Characteristics ||||||
|---|---|---|---|---|---|
| Wheel (agglomerate samples Ex. 2, 5) | Wheel Composition Volume % ||| Relative Air Permeability[b] | Fired Density g/cc | Mod. of Elasticity d/cm² × 10¹⁰ |
| | Agglom.[a] | Bond[d] | Porosity | | | |
| (10) | 37.50 | 5.70 | 56.80 | 81.8 | 1.62 | 10.7 |
| (11) | 37.50 | 5.70 | 56.80 | 84.1 | 1.61 | 10.6 |
| (12) | 37.50 | 5.70 | 56.80 | 87.8 | 1.60 | 11.1 |
| (12) | 37.50 | 5.70 | 56.80 | 89.5 | 1.60 | 10.2 |
| (13) | 37.50 | 5.70 | 56.80 | 79.2 | 1.61 | 11.4 |
| (27) | 37.50 | 8.40 | 54.10 | 90.3 | 1.66 | 13.9 |
| (26) | 37.50 | 8.40 | 54.10 | 90.6 | 1.65 | 14.8 |
| (26) | 37.50 | 8.40 | 54.10 | 80.1 | 1.65 | 15.4 |
| (25) | 37.50 | 8.40 | 54.10 | n/a | 1.66 | 15.6 |
| (24) | 37.50 | 8.40 | 54.10 | n/a | 1.69 | 17.6 |

TABLE 7-1-continued

Abrasive Wheel Characteristics

| Comparative samples[c] non-agglomerated grain | Grain vol % | Bond Vol % | Porosity vol % | | | |
|---|---|---|---|---|---|---|
| 38A60-D25VCF2 | 37.50[a] | 4.70 | 57.80 | 75.8 | 1.60 | 9.20 |
| 38A60-D25VCF2 | 37.50[a] | 4.70 | 57.80 | 75.8 | 1.59 | 9.60 |
| 38A60-E25VCF2 | 37.50[a] | 5.70 | 56.80 | 59.6 | 1.67 | 19.80 |
| 38A60-D28VCF2 | 36.00[a] | 4.70 | 59.30 | n/a | 1.64 | 15.50 |

[a]At 37.50 vol. % abrasive grain, the comparative wheels contained a greater volume % abrasive grain (i.e., 1–3 volume % more) than the experimental wheels made with 37.50 vol. % agglomerated grain, binding material and intra-agglomerate porosity.
[b]Fluid (air) permeability was measured by the test methods disclosed in U.S. Pat. Nos. 5,738,696 and 5,738,697, assigned to Norton Company. Relative air permeability values are expressed in cc/second/inch of water units.
[c]Comparative wheel samples were commercial products obtained from Saint-Gobain Abrasives, Inc., Worcester, MA, and marked with the wheel designations indicated for each in Table 7-1.
[d]Values for volume % bond of the experimental wheels do not include the volume % glass binding material used on the grains to make the agglomerates. Volume % bond represents only the materials added to make the grinding wheels.

The wheels were tested in a creepfeed grinding operation against comparative commercial wheels recommended for use in creepfeed grinding operations (the comparative wheels are described in Tables 7-1 and 7-2). The comparative wheels had the same size dimensions, comparable hardness grades and were otherwise suitable comparative wheels to the experimental wheels in a creepfeed grinding study, but they were made without agglomerates.

Grinding Conditions:
Machine: Hauni-Blohm Profimat 410
Mode: Slot creepfeed grind
Depth of Cut: 0.125 inch (0.318 cm)
Wheel speed: 5500 surface feet per minute (28 m/sec)
Table speed: Varied in increments of 2.5 in/min (6.4 cm/min.) from 5–17.5 inches/minute (12.7–44.4 cm/minute) or until failure observed (workpiece burn or machine or wheel failure)
Coolant: Master Chemical Trim E210 200, at 10% concentration with deionized well water, 95 gal/min (360 L/min)
Workpiece material: AISI 4340 steel 48–50 Rc hardness
Dress mode: rotary diamond, non-continuous
Dress compensation: 40 micro-inch/rev (1 micrometer/rev)
Total radial dress compensation: 0.02 inch/rev (0.5 mm/rev)
Speed ratio: +0.8

In these grinding runs, the table speed was increased until failure was observed. Failure was denoted by workpiece burn or by excessive wheel wear as indicated by power data, wheel wear (WWR) measurements, measurements of surface finish and visual inspection of the ground surface. The material removal rate (maximum MRR) at which failure occurred was noted.

As set forth in Table 7-2, below, these grinding tests demonstrated that the experimental wheels containing the agglomerates were consistently able to achieve higher maximum material removal rates than the comparative wheels. The experimental wheels also exhibited acceptable values for the other, less critical, grinding parameters observed in creepfeed operations (i.e., WWR, power and surface finish).

TABLE 7-2

Grinding Test Results

| Wheel (agglomerate samples Ex. 2, 5) | Wheel Composition Volume % | | | Maximum MRR | WWR | Specific Grinding Energy | Average Surface Roughness |
|---|---|---|---|---|---|---|---|
| | Agglom.[a] | Bond | Porosity | mm³/s/mm | mm³/s/mm | J/mm³ | μm |
| (10) | 37.50 | 5.70 | 56.80 | 16.4 | 0.27 | 45.1 | 1.07 |
| (11) | 37.50 | 5.70 | 56.80 | 13.6 | 0.14 | 45.8 | 1.04 |
| (12) | 37.50 | 5.70 | 56.80 | 16.3 | 0.43 | 44.0 | 1.40 |
| (12) | 37.50 | 5.70 | 56.80 | 13.8 | 0.14 | 44.8 | 1.05 |
| (13) | 37.50 | 5.70 | 56.80 | 13.6 | 0.24 | 45.8 | 1.03 |
| (27) | 37.50 | 8.40 | 54.10 | 16.3 | 0.21 | 47.3 | 0.97 |
| (26) | 37.50 | 8.40 | 54.10 | 13.7 | 0.17 | 50.3 | 0.86 |
| (26) | 37.50 | 8.40 | 54.10 | 11.0 | 0.09 | 54.4 | 0.80 |
| (25) | 37.50 | 8.40 | 54.10 | 13.5 | 0.12 | 52.4 | 0.89 |
| (24) | 37.50 | 8.40 | 54.10 | 10.9 | 0.08 | 54.6 | 0.77 |

TABLE 7-2-continued

Grinding Test Results

| Comparative samples[c] non-agglomerated grain | Grain vol % | Bond Vol % | Porosity vol % | | | | |
|---|---|---|---|---|---|---|---|
| JOHN02 38A60-D25VCF2 | 37.50 | 4.70 | 57.80 | 8.3 | 0.12 | 46.7 | 1.28 |
| EB030-2 38A60-D25VCF2 | 37.50 | 4.70 | 57.80 | 10.8 | 0.14 | 46.5 | 1.16 |
| EB012-2 38A60-E25VCF2 | 37.50 | 5.70 | 56.80 | 11.0 | 0.07 | 58.5 | 0.67 |
| JOHN01 38A60-D28VCF2 | 36.00 | 4.70 | 59.30 | 11.0 | 0.12 | 54.7 | 0.68 |

[a]At 37.50 vol. % abrasive grain, the comparative wheels contained a greater volume % abrasive grain (i.e., 1–3 volume % more) than the experimental wheels made with 37.50 vol. % agglomerated grain, binding material and intra-agglomerate porosity.

EXAMPLE 8

An agglomerated abrasive grain sample (60) was prepared in the rotary calcination apparatus, with a silicon carbide tube, described in Example 1 and illustrated in FIG. 1. The process of agglomeration was carried out under atmospheric conditions, at 1,350° C., with an apparatus tube rotation rate of 9 rpm, a tube incline angle of 3 degrees, and a feedrate of 6–10 kg/hour.

The agglomerate sample was made from a mixture of 38A alumina abrasive grain, 60 grit size (same grain as used in Examples 1 and 6), 5.0 wt % binding material F (based on weight of abrasive grain) and 2.5 wt % Binder 3 in water (50/50 weight mixture based on weight of abrasive grain).

After agglomeration in the rotary calcination apparatus, the agglomerated abrasive grain was screened and tested for loose packing density (LPD) and other attributes by the methods described above. The yield of usable free-flowing agglomerates (defined as −12 mesh to pan) was 72.6% of the feedstock before sintering. The LPD of the agglomerate was 1.11 g/cc and the relative density was 28.9%. These sintered agglomerates were used to make grinding wheels having a finished size of 16.25×0.75×5.00 inch (41.3×2.4×12.8 cm).

To make the abrasive wheels, the agglomerates were added to a mixer along with a powdered vitrified bond composition (corresponding to Binding material C from Table 1-2) and liquid Binder 3 to make a mixture. The wheels were then molded from this mixture, dried, fired to a maximum temperature of 900° C., graded, finished, balanced and inspected according to commercial grinding wheel manufacturing techniques known in the art. Wheels were made to correspond in modulus of elasticity value to comparative wheels having a standard wheel hardness grade in the E grade range on the Norton Company hardness grade scale.

The characteristics of the fired abrasive wheels and a comparative commercial wheel, obtained from Saint-Gobain Abrasives, Inc., Worcester, Mass., are described in Table 8-1 below.

TABLE 8-1

Abrasive Wheels

| Abrasive Wheel Sample | Wheel Composition | | | Air Permeability[b] | Fired Density g/cc | Mod. of Elasticity d/cm² × 10¹⁰ |
|---|---|---|---|---|---|---|
| | Agglom. Vol. % | Bond[c] vol % | Porosity vol % | | | |
| Experimental 8-4 | 37.50 | 9.88 | 52.62 | 90.4 | 1.66 | 17.5 |
| 8-11 | 37.5 | 9.88 | 52.62 | 87.4 | 1.66 | 17.5 |
| 8-17 | 37.5 | 9.88 | 52.62 | 88.3 | 1.66 | 17.5 |
| Comparative | Grain vol % | Bond vol % | Porosity vol % | | | |
| 38A605-D28VCF2 | 37.50 | 5.73 | 56.77 | 43.5 | 1.65 | 17.3 | a) At 37.50 vol. % abrasive grain component, the comparative sample wheels contained a larger volume percentage abrasive grain (i.e., about 1–3 vol. % more) than the experimental wheels of the invention containing a mixture of 37.50 vol. % agglomerated grain, binding material and intra-agglomerate porosity.
[b]Fluid (air) permeability was measured by the test methods disclosed in U.S. Pat. Nos. 5,738,696 and 5,738,697, assigned to Norton Company. Relative air permeability values are expressed in cc/second/inch of water units.
[c]Values for volume % bond do not include the volume % binding material used on the grains to make the agglomerates. Volume % bond represents only the materials added to make the grinding wheels.

Abrasive grinding wheels described in Table 8-1 were tested in a creepfeed grinding test. Parameters for the creepfeed grinding test were set to yield the following grinding conditions.

Grinding Conditions:
Machine: Hauni-Blohm Profimat 410
Mode: Slot creepfeed grind
Depth of Cut: 0.125 inch (0.318 cm)
Wheel speed: 5500 surface feet per minute 28 m/sec)
Table speed: Varied in increments of 2.5 in/min (6.4 cm/min.) from 5–15 inches/minute (12.7–38.1 cm/minute) or until failure observed (workpiece burn or machine or wheel failure)
Coolant: Master Chemical Trim E210 200, at 10% concentration with deionized well water, 95 gal/min (360 L/min)
Workpiece material: AISI 4340 steel 48–50 Rc hardness
Dress mode: rotary diamond, non-continuous
Dress compensation: 40 microinch/rev (1 micrometer/rev)
Total radial dress compensation: 0.02 inch
Speed ratio: +0.8

In these grinding runs, the table speed was increased until failure was observed. Failure was denoted by workpiece burn or by excessive wheel wear as indicated by power data, wheel wear (WWR) measurements and visual inspection of the ground surface. The material removal rate (MRR) (i.e., the maximum MRR before failure) at which failure occurred was noted. Measurements of surface finish also were made.

As set forth in Table 8-2, below, these grinding tests demonstrated that the experimental wheels containing the agglomerates were able to consistently achieve higher material removal rates before burning the workpiece. The maximum MRR for the comparative wheel was at a table speed of only 12.5 inch/minute (5.29 mm/sec), whereas the experimental wheel's maximum MRR was at a table speed of 15 inch/minute (6.35 mm/sec).

The experimental wheels also exhibited comparable, and commercially acceptable, values for the other, grinding parameters observed at the highest MRR achieved by the comparative wheels in this creepfeed operation (i.e., power and surface finish at the 5.29 mm/sec table speed).

TABLE 8-2

Grinding Test Results

| Wheel Sample | Table Speed mm/s | MRR mm³/s, mm | Power W/mm | Ave. Roughness μm | Work piece quality observations |
|---|---|---|---|---|---|
| experimental | | | | | |
| 8-4 | 3.18 | 10.00 | 403.1 | 0.80 | |
| | 3.18 | 10.00 | 411.0 | 0.80 | |
| | 4.23 | 13.44 | 516.7 | 0.89 | |
| | 4.23 | 13.44 | 516.7 | 1.04 | |
| | 5.29 | 16.77 | 614.5 | 0.93 | |
| | 5.29 | 16.77 | 638.0 | 0.99 | |
| maximum 8-11 | 6.35 | 19.89 | 712.5 | 0.88 | slight exit burn |
| | 3.18 | 10.00 | 403.1 | 0.90 | |
| | 3.18 | 10.11 | 395.5 | 0.86 | |
| | 4.23 | 14.30 | 516.7 | 1.00 | |
| | 4.23 | 14.09 | 508.8 | 0.93 | |
| | 5.29 | 16.77 | 634.1 | 0.86 | |
| | 5.29 | 16.67 | 634.1 | 0.91 | |
| maximum 8-17 | 6.35 | 19.89 | 724.3 | 0.97 | slight exit burn |
| | 3.18 | 10.00 | 411.0 | 0.99 | |
| | 3.18 | 10.11 | 407.2 | 0.85 | |
| | 4.23 | 13.33 | 528.4 | 0.94 | |
| | 4.23 | 13.33 | 520.5 | 0.97 | |
| | 5.29 | 16.67 | 630.3 | 0.89 | |
| | 5.29 | 16.56 | 638.0 | 0.97 | |
| maximum | 6.35 | 20.00 | 716.3 | 0.99 | slight exit burn |
| comparative | 2.12 | 6.77 | 273.9 | 0.77 | |
| | 3.18 | 9.89 | 391.3 | 0.79 | |
| | 3.18 | 10.00 | 395.5 | 0.95 | |
| | 3.18 | 10.00 | 399.3 | 0.93 | |
| | 4.23 | 13.33 | 508.8 | 0.88 | |
| | 4.23 | 13.44 | 516.7 | 0.79 | |
| | 5.29 | 16.67 | 598.9 | 0.91 | severe entry burn |
| | 5.29 | 16.77 | 618.6 | 0.83 | severe entry burn |
| maximum | 5.29 | 16.77 | 614.5 | 0.89 | severe entry burn |

EXAMPLE 9

Abrasives wheels made with agglomerate sample 35 of Example 5 were tested in a dry surface crossfeed grinding process typical of the processes used in toolroom grinding operations. A comparative commercial abrasive wheel was compared to the wheels of the invention in this test.

The abrasive wheels containing agglomerates were made by the method of Example 8 and fired at a maximum temperature of 900° C., however, the size of the wheels was 7×0.5×1.25 inch (17.8×1.3×3.2 cm). Fired wheels contained 40% agglomerates, 11–12.1% vitrified bond and 47.9–49% porosity, on a volume percent basis. Firing conditions for the wheels of the invention and properties of the fired abrasive wheels and the comparative wheels are described in Table 9-1.

TABLE 9-1

Abrasive Wheels

| Wheel (Grade H hardness) Experimental Ex. 5 Agglo. Sample No. | Wheel composition | | | Air Permeability[b] | Fired Density g/cc | Mod. of Elasticity GPa |
|---|---|---|---|---|---|---|
| | Agglom vol % | Bond[c] vol % | Porosity vol % | | | |
| 35-1 | 41.8 | 11.1 | 46.9 | 41.0 | 1.85 | 27.2 |
| 35-2 | 42.5 | 12.1 | 44.9 | 31.1 | 1.91 | 30.8 |
| 35-3 | 40.0 | 11.0 | 49.3 | 58.1 | 1.80 | 22.7 |
| Comparative Wheel[a] | Grain vol % | Bond vol % | Porosity vol % | | | |
| 38A60-H12VBEP 1330.2 | 40.5 | 8.6 | 50.9 | 35.7 | 1.79 | 26.3 |

[a]At 40.5 vol. % abrasive grain component, the comparative sample wheels contained a larger volume percentage abrasive grain (see Table 9-2, below) than the experimental wheels of the invention containing 40–42.5 vol. % agglomerated grain (including binding material and intra-agglomerate porosity).
[b]Air permeability was measured by the test methods disclosed in U.S. Pat. Nos. 5,738,696 and 5,738,697, assigned to Norton Company.
[c]Values for volume % bond do not include the volume % glass binding material used on the grains to make the agglomerates. Volume % bond represents only the materials added to make the grinding wheels.

The volume percentage abrasive grain and glass binding material of the agglomerates used in the experimental wheels is set forth in Table 9-2, below.

TABLE 9-2

Wheel composition adjusted for agglomerate components

| Sample No. Ex. 5 Agglomerate | Volume % Agglom. | Volume % binding material in Agglom. | Volume % grain in wheel | Volume % bond (+binding material) in wheel | Volume % porosity in wheel |
|---|---|---|---|---|---|
| Experimental | | | | | |
| 35-1 | 41.8 | 3.9 | 37.9 | 15.2 | 46.9 |
| 35-2 | 42.5 | 4.0 | 38.5 | 16.6 | 44.9 |
| 35-2 | 40.0 | 1.9 | 38.1 | 12.6 | 49.3 |
| comparative[a] | — | — | 40.5 | 8.6 | 50.9 |

[a] At 40.5 vol. % abrasive grain, the comparative wheels contained a greater volume % abrasive grain (i.e., 1–3 volume % more) than the experimental wheels made with 40–42.5 vol. % agglomerated grain, binding material and intra-agglomerate porosity.

Grinding Conditions:
Machine: Brown & Sharpe Surface Grinder
Mode: Dry surface grind
Crossfeed: 0.508 mm
Wheel speed: 3500 rpm; 6500 sfpm
Table speed: 50 fpm (15240 mm/min)
Coolant: None
Workpiece material: D3 steel Rc 60 hardness 203.2 mm long×47.8 mm wide
Dress mode: Single point diamond
Dress Comp.: 0.025
Dress Lead: 254 mm/min In these grinding runs, the downfeed was increased until failure was observed. In surface tool-room grinding operations, as in creep-feed grinding operations, the most significant performance parameter is the maximum material removal rate (MRR) capacity of the grinding wheel. Thus, maximum MRR at which grinding failure occurred was noted for each grinding wheel, and failure was denoted by visual burn observations of the workpiece, excessive power, or by excessive wheel wear rate (WWR). Measurements of surface finish were also made.

As set forth in Tables 9-2 and 9-3, below, this grinding test demonstrated that the experimental wheels containing the agglomerates consistently achieved higher maximum material removal rates before wheel breakdown by wear. Furthermore, the higher MRRs were achieved with lower power while maintaining comparable surface roughness values.

TABLE 9-2

Grinding Test Results

| Wheel Sample | Total Infeed mm | MRR' $mm^3/s$, mm | G-ratio MRR/WRR | Specific Energy W·$s/mm^3$ | Surface Finish Ra (μin) |
|---|---|---|---|---|---|
| Experimental | | | | | |
| 35-1 | 0.102 | 19.0 | 9.00 | 81.9 | 25 |
| | 0.152 | 21.0 | 7.51 | 79.6 | 20 |
| | 0.203 | 26.1 | 7.95 | 64.5 | 24 |
| | 0.254 | 34.2 | 7.62 | 55.7 | 22 |
| | 0.305 | 42.9 | 6.85 | 44.4 | 29 |
| | 0.356 | 50.3 | 6.89 | 42.9 | 19 |
| | 0.406 | 51.0 | 6.39 | 41.4 | 30 |
| | 0.457 | 64.5 | 6.86 | 36.1 | 21 |
| | 0.559 | 69.4 | 5.75 | 35.9 | 28 |
| | 0.660 | 89.4 | 6.19 | 30.0 | 24 |
| 35-2 | 0.102 | 17.1 | 12.82 | 86.6 | 23 |
| | 0.203 | 28.1 | 9.24 | 62.8 | 26 |
| | 0.305 | 41.9 | 7.90 | 51.1 | 28 |
| | 0.406 | 56.8 | 6.95 | 40.2 | 32 |
| | 0.508 | 64.8 | 5.73 | 38.1 | 30 |
| | 0.610 | 83.5 | 5.61 | 35.1 | 33 |
| 35-3 | 0.102 | 12.3 | 7.13 | 137.5 | 12 |
| | 0.203 | 26.5 | 8.09 | 67.9 | 12 |
| | 0.305 | 41.3 | 7.68 | 47.7 | 16 |
| | 0.406 | 54.2 | 6.54 | 41.6 | 16 |
| | 0.508 | 67.1 | 5.84 | 34.7 | 23 |
| comparative | | | | | |
| 38A60- H12VBE | 0.102 | 16.5 | 9.48 | 98.6 | 11 |
| | 0.203 | 27.4 | 8.55 | 60.9 | 15 |
| | 0.305 | 41.9 | 6.80 | 46.6 | 17 |
| | 0.406 | 51.9 | 5.92 | 39.7 | 18 |
| | 0.508 | 52.9 | 4.02 | 43.8 | 25 |

TABLE 9-3

Grinding Test Results-Wheel wear measurements[a]

| Wheel Sample | Total Infeed mm | A mil | B mil | C mil | D mil | Area $mm^2$ | % wheel face wear |
|---|---|---|---|---|---|---|---|
| Experimental | | | | | | | |
| 35-1 | 0.102 | 0.0033 | 0.0038 | 0.1115 | 0.1424 | 0.2932 | 53 |
| | 0.660 | 0.0151 | 0.0148 | 0.2026 | 0.2283 | 2.0768 | 90 |
| 35-2 | 0.102 | 0.0027 | 0.0029 | 0.0879 | 0.1149 | 0.0020 | 42 |
| | 0.610 | 0.0146 | 0.0149 | 0.2161 | 0.2248 | 2.0982 | 90 |
| 35-3 | 0.102 | 0.0031 | 0.0028 | 0.1083 | 0.1434 | 0.2378 | 53 |
| | 0.508 | 0.0119 | 0.0117 | 0.1835 | 0.2402 | 1.6110 | 89 |

TABLE 9-3-continued

Grinding Test Results-Wheel wear measurements[a]

| Wheel Sample | Total Infeed mm | A mil | B mil | C mil | D mil | Area mm² | % wheel face wear |
|---|---|---|---|---|---|---|---|
| Comparative | | | | | | | |
| 38A60- | 0.102 | 0.0035 | 0.0033 | 0.1117 | 0.1053 | 0.2382 | 43 |
| H12VBE | 0.508 | 0.0119 | 0.0115 | 0.2170 | 0.2701 | 1.8350 | 96 |

[a]Wheel wear was measured by a variation of the method ("corner holding test") described in U.S. Pat. No. 5,401,284, assigned to Norton Company. For the data in this Table, the values A and D were measured at the wheel perimeter, along the wheel grinding face, and the values B and C were measured at equidistant points near the center of the wheel grinding face. As grinding progresses, the relative stability of valuesA and D, compared to values B and C, is an indicator of the wheel wear resistance of the wheel. The "Area" is the amount of material removed from the wheel. The % wheel face wear reflects the width of the wheel wear at the center of the wheel grinding face, near the points where the values B and C are measured.

EXAMPLE 10

Abrasives wheels made with abrasive grain agglomerates were tested in an inner diameter (ID) grinding test.

Agglomerates (sample 61) were prepared as described in Example 2, except the temperature was maintained constant at 1170° C. (sample 61). Additionally, a model #KOU-8D48-RTA-20 rotary calciner apparatus, equipped with a 108 inch (274 cm) long, 8 inch (20 cm) inner diameter, silicon carbide tube, having a 48 inch (122 cm) heated length with three temperature control zones, was used. This apparatus was manufactured by Harper International, Buffalo, N.Y. The process of agglomeration was carried under atmospheric conditions, with an apparatus tube rotation rate of 6 rpm, a tube incline angle of 2.5–3.0 degrees, and a feed rate of 8–10 kg/hour. The apparatus used was substantially identical to the apparatus illustrated in FIG. 1.

Agglomerate sample 61 was made with 30 lbs (13.63 Kg) abrasive grain (120 grit 32A alumina grain, obtained from Saint-Gobain Ceramics and Plastics, Inc.) and 1.91 lbs (0.87 Kg) binding material A (yielding 6.36 wt % binding material in the sintered agglomerate). The binding material was dispersed in water (0.9 lbs; 0.41 Kg) prior to addition to the grain. The agglomerates had an average size of 260 microns and a loose packed density (LPD) of 1.13 g/cc.

A comparative commercial abrasive wheel was compared to the wheels of the invention in this test. The comparative wheel had the same size dimensions and was made with the same abrasive grain, but without agglomerates. The comparative wheel was marked 32A120-LVFL and was obtained from Saint-Gobain Abrasives, Inc., Worcester, Mass.

To make the experimental abrasive wheel, the agglomerates were added to a mixer along with a powdered vitrified bond composition and liquid Binder 3 to make a mixture. The wheels were then molded from this mixture, dried, fired to a maximum temperature of 900° C., graded, finished, balanced and inspected according to commercial grinding wheel manufacturing techniques known in the art.

The grinding wheels were 1A type wheels, having a finished size of 1.8×1.0×0.63 inch (4.57×2.54×1.60 cm). The composition and characteristics of the experimental and comparative wheels are listed below in Table 10-1.

TABLE 10-1

Abrasive Wheels

| Sample Experimental Wheel | Wheel composition | | | Wheel Hardness Grade | Fired Density g/cc | Mod. of Elasticity GPa |
|---|---|---|---|---|---|---|
| | Agglom vol % | Bond[c] vol % | Porosity vol % | | | |
| 32A120 | 48 | 10.26 | 41.74 | L | 2.08 | 42.1 |
| Comparative Wheel[a,b] | Grain vol % | Bond vol % | Porosity vol % | | | |
| 32A120 LVFL | 52 | 8.11 | 39.89 | L | 2.23 | 50.9 |

[a]At 52 vol. % abrasive grain component, the comparative sample wheels contained a larger volume percentage grain than the wheels of the invention containing 48 vol % of a mixture of agglomerated grain with binding material. After deducting the percent of binding material, the experimental wheel contains only 43.4 volume % of grain, 8.6 volume % less grain than the comparative standard wheel of the same grade.
[b]Abrasive grain grit size of 120 corresponds to 142 microns.
[c]Values for volume % bond do not include the volume % binding material used on the grains to make the agglomerates. Volume % bond represents only the materials added to make the grinding wheels.

Abrasive grinding wheels described in Table 10-1 were tested in an inner diameter (ID) grinding test. Parameters for the ID grinding test were set to yield the following grinding conditions.

Grinding Conditions:

Machine: Okuma ID grinder

Mode: Wet ID, plunge, climb grind

Wheel speed: 18000 rpm

Work speed: 600 rpm

Coolant: Master Chemical Trim E210, 5% in deionized well water

Workpiece material: 52100 steel Rc 60 hardness rings: 2.225×0.50 inch (5.65×1.28 cm)

Dress mode: Rotary single point diamond

Dress Ratio: 0.650

Dress Lead: 0.304 mm/rev

In these tests, three sets of grinds were conducted at constant infeed rates and five grinds were conducted for each set. The infeed rate sets a nominal material removal rate for each test. In ID grinding operations, the most significant performance parameters are the G-ratio (MRR/wheel wear rate (WWR)), the specific energy required to grind at a set infeed rate and the resulting surface finish. Data in the table below is given for each set of infeed rates; the surface finish data represents the value after the fifth grind of each set.

As set forth in Table 10-2, below, these grinding tests demonstrated the performance of the experimental wheel containing the agglomerates was comparable to, or better than, that of the comparative wheel in G-ratio (MRR/wheel wear rate (WWR)), specific grinding energy and surface finish. These results are surprising in view of the significantly lower volume percentage of abrasive grain in the experimental wheel. Within normal wheel structures, the volume % abrasive grain is the most significant variable in determining the G-ratio. In the absence of other variables, a higher grain content results in a proportionally higher G-ratio. A reduction in the volume percentage of grain needed to achieve the same or better G-ratio represents a significant technical improvement in the abrasive tool.

TABLE 10-2

Grinding Test Results

| Wheel Sample | Radial Infeed Rate mm/min | MRR mm$^3$/s, mm | G-ratio$^a$ WWR/MRR | Specific Grinding Energy J/mm$^3$ | Surface Finish Ra |
|---|---|---|---|---|---|
| comparative | | | | | |
| 32A120 LVFL | 1.10 | 3.25 | 50.5 | 52.1 | 0.72 |
| | 1.83 | 5.45 | 59.4 | 49.4 | 0.84 |
| | 2.54 | 7.66 | 42.5 | 49.1 | 1.19 |
| experimental | | | | | |
| 32A120 | 1.10 | 3.25 | 65.8 (78.8) | 52.1 | 0.82 |
| | 1.83 | 5.45 | 55.0 (65.9) | 48.3 | 1.02 |
| | 2.54 | 7.66 | 42.9 (51.4) | 45.9 | 1.18 |

$^a$The G-ratio given in parentheses for the experimental wheel is a value adjusted for the smaller volume percentage of abrasive grain in the experimental wheel. In other words, the volume percentage of grain in the experimental wheels is only 83.46% of the volume percentage of grain in the comparative wheels. Thus, the experimental wheel G-ratio values shown in the parentheses have been normalized to the volume % grain of the comparative wheels in order to obtain a performance measure based upon total abrasive grain usage.

EXAMPLE 11

The agglomerated abrasive grain of the invention was used to manufacture large abrasive wheels in order to confirm the feasibility of manufacturing such wheels without the use of added pore inducers and using such wheels in creepfeed grinding.

The agglomerated abrasive grain (sample 62) was prepared in the rotary calcination apparatus, with a silicon carbide tube, described in Example 1 and illustrated in FIG. 1. The process of agglomeration was carried out under atmospheric conditions, at 1,350° C., with an apparatus tube rotation rate of 9 rpm, a tube incline angle of 3 degrees, and a feedrate of 6–10 kg/hour.

The agglomerate grain sample 62 was made from a 50/50 mixture of 32A and 38A alumina abrasive grain, both 60 grit size (same grain as used in Examples 1 and 6), 5.0 wt % binding material E (based on weight of abrasive grain) and 2.5 wt % Binder 3 (50/50 weight mixture in water based on weight of abrasive grain).

After agglomeration in the rotary calcination apparatus, the agglomerated abrasive grain samples were screened and tested for loose packing density (LPD) and other attributes by the methods described above. The yield of usable free-flowing granules (defined as −12 mesh to pan) was 74.1% of the total weight of the feedstock before calcination. The LPD of the agglomerate was 1.14 g/cc, and the relative density was 30.0%.

These sintered agglomerates were used to make relatively large (e.g., 20 inch (50.8 cm) diameter) creep-feed grinding wheels. Comparative wheels of this size normally are made with bubble alumina or other solid or closed cell pore inducers as aids to stiffen the structure and prevent wheel shape distortion from slumpage during firing as the vitrified bond melts and flows. Bubble alumina is particularly effective in preventing slumpage but it is undesirable in grinding performance as it creates closed cell porosity.

To make the experimental abrasive wheels, the agglomerates were added to a mixer along with a powdered vitrified bond composition (corresponding to Binding material C from Table 2) and liquid Binder 3 to make a mixture. The wheels were then molded from this mixture, dried, fired to a maximum temperature of 900° C., graded, finished, balanced and inspected according to commercial grinding wheel manufacturing techniques known in the art. The fired wheels were then finished to a size of 20×1×8 inch (50.8× 2.5×20.3 cm). A moderate, but commercially acceptable degree of slumping of the experimental wheels was observed during firing of the wheels.

Wheels were designed to correspond in volume percentage composition and density to comparative, commercial wheels having a standard wheel hardness grade between the C and D grades on the Norton Company hardness grade scale.

The characteristics of the finished experimental and comparative abrasive grinding wheels are described in Table 11-1 below. Although wheel composition percentages and densities would have predicted wheels having equivalent wheel hardness values, in fact, the modulus of elasticity confirmed the experimental wheels were of a softer grade than the comparative wheels. The air permeability values show the porosity of the experimental wheel, in contrast to that of the comparative wheel, to be porosity having open permeability, permitting free flow of coolant in the wheel and easy removal of grinding debris from the grinding face of the wheel.

TABLE 11-1

Abrasive Wheels

| Wheel Sample | Wheel Composition | | | Relative Air Permeability[b] | Fired Density g/cc | Mod. of Elasticity d/cm² × 10¹⁰ |
|---|---|---|---|---|---|---|
| | Agglom. Vol. % | Bond vol % | Porosity vol % | | | |
| Experimental Agglomerate 62 | 36.00 | 7.03 | 56.97 | 74.9 | 1.52 | 10.24 |
| Comparative | Grain vol % | Bond vol % | Porosity vol % | | | |
| 32A605-D28VCF2 | 36.00 | 5.50 | 58.50 | 46.2 | 1.52 | 14.01 | a) At 36.0 vol. % abrasive grain component, the comparative sample wheels contained a larger volume percentage grain (i.e., about 1–2 volume % more) than the wheels of the invention containing a mixture of 36.0 vol. % of a combination of agglomerated grain and binding material.
[b]Fluid (air) permeability was measured by the test methods disclosed in U.S. Pat. Nos. 5,738,696 and 5,738,697, assigned to Norton Company. Relative air permeability values are expressed in cc/second/inch of water units.

The wheels were tested in the creepfeed grinding operation described in Example 7 along with the comparative creepfeed grinding wheel described in Table 11-2. The comparative wheel was a standard commercial product available from Saint-Gobain Abrasives, Inc., Worcester, Mass. It had the same size dimensions and was otherwise comparable to the experimental wheels, but had been made with bubble alumina filler, and no abrasive grain agglomerates.

TABLE 11-2

Grinding Test Results

| Wheel Sample | Table Speed mm/s | MRR mm³/s, mm | Specific Energy J/mm³ |
|---|---|---|---|
| Comparative | 2.1 | 6.7 | 56.6 |
| | 3.2 | 10.0 | 47.0 |
| | 5.3 | 16.5 | 39.2 |
| Experimental | 2.1 | 6.7 | 55.7 |
| | 3.2 | 10.0 | 46.5 |
| | 5.3 | 16.7 | 40.0 |

These results demonstrate the feasibility of manufacturing and using a creepfeed grinding wheel of the dimensions tested without the use of a closed porosity filler material such as bubble alumina.

EXAMPLE 12

The agglomerate size distribution was compared before and after molding abrasive grinding wheels of the invention to examine the integrity and strength of the agglomerates in abrasive wheel manufacturing processes. The agglomerate size distribution was then compared with the abrasive grain size distribution of the grain used to make the agglomerates to confirm that the agglomerates still comprised a plurality of abrasive grains after molding grinding wheels.

Agglomerates (sample nos. 63, 64, 65) were prepared as described in Example 2, except the temperature was maintained constant at 1200° C. (for samples 63 and 64) or at 1300° C. (sample 65). Additionally, a rotary calciner apparatus (model Bartlett-Snow™), manufactured by Alstom Power, Naperville, Ill., equipped with a 120 inch (305 cm) long, 6.5 inch (16.5 cm) inner diameter, proprietary high temperature metal alloy tube, having a 72 inch (183 cm) heated length with four temperature control zones, was used. The process of agglomeration was carried under atmospheric conditions, with an apparatus tube rotation rate of 9 rpm, a tube incline angle of 2.5 degrees, and a feed rate of 10–14 kg/hour. The apparatus used was substantially identical to the apparatus illustrated in FIG. 1.

Agglomerate samples 63, 64, and 65 were made with abrasive grains obtained from Saint-Gobain Ceramics and Plastics, Inc. and different binding materials as described in Table 12-1 below.

TABLE 12-1

Agglomerate Compositions

| Sample No. | Abrasive grain wt % mixture grit size grain type | Binding Material | Wt % Binding Material |
|---|---|---|---|
| 63 | 70/30 wt % 46 grit 86A alumina/ 46 grit Norton SG ® sol gel alumina | C | 4.5 |
| 64 | 50/50 wt % 46 grit 38A alumina/ 46 grit Norton SG ® sol gel alumina | C | 4.5 |
| 65 | 46 grit 55A alumina | A | 4.5 |

Experimental wheels were mixed and molded to the size and shape described in Example 10, using a powdered vitrified bond composition and liquid Binder 3. The bond composition used for wheels containing agglomerates 63 and 64 corresponded to Binding Material C, and for wheels containing agglomerate 65 corresponded to Binding Material E, described in Table 2. The volume % of agglomerates, bond and porosity are described in Table 12-2 below.

After molding the wheels under pressure to obtain a "green" wheel and prior to firing these molded wheels, the wheel bond materials were washed out of the green wheel structure under running water and the agglomerates and abrasive grain were recovered. The size of the recovered agglomerates and grain was determined by screening them through a series of U.S. sieve size mesh screens and measuring the weight fraction for each screen. Results are shown in Table 12-2, below, for wheels made to three different specifications.

TABLE 12-2

Size distribution of agglomerates following wheel molding

| Wheel Sample | Vol % aggl. | Vol % bond | Vol % pores | Ave. Initial Grain Size μm | Ave. Initial Agglom. Size μm | Initial Size Distribution Agglom. Range μm | Ave. Agglom. Size after molding & washing μm | Size Distribution of Molded Agglom. Range μm |
|---|---|---|---|---|---|---|---|---|
| 12-1 | 40 | 11.55 | 48.45 | 355 | 998 | 500–1700 | 824 | 355–1200 |
| 12-2 | 40 | 11.55 | 48.45 | 355 | 920 | 500–1700 | 767 | 355–1200 |
| 12-3 | 40 | 8.5 | 51.50 | 355 | 1035 | 500–1700 | 863 | 355–1200 |

The data of Table 12-2 demonstrate from the average dimensions of the sintered agglomerates (before and after processing) that a plurality of abrasive grains has been retained in the sintered agglomerates after they have been molded to form a grinding wheel. While the initial size of the agglomerates has been reduced by a minor percentage (e.g., a drop from 998 to 824 μm, or a 17% reduction, for sample 12-1), the majority of the agglomerates have retained their initial size.

The distribution of weight fractions after screening each sample is given in Tables 12-2a, 12-2b and 12-2c, below for samples 12-1, 12-2 and 12-3, respectively.

TABLE 12-2a

Particle size distributions for Sample 12-1

| Sieve # ASTM-E | Sieve # ISO 565 size of opening μm | Initial grit size distribution | Initial agglomerate size distribution | Agglomerate size distribution after molding |
|---|---|---|---|---|
| 70 | 212 | 0 | | |
| 60 | 250 | 5 | | |
| 50 | 300 | 28 | | |
| 45 | 355 | 53 | | 5.7 |
| 40 | 425 | 14 | | 2.9 |
| 35 | 500 | | 1.1 | 6.0 |
| 30 | 600 | 0 | 3.4 | 11.1 |
| 25 | 725 | | 8.7 | 15.8 |
| 20 | 850 | | 18.2 | 21.2 |
| 18 | 1000 | | 29.0 | 20.9 |
| 16 | 1180 | | 37.9 | 16.5 |
| −10/+12 | 1700 | | 0.9 | 0 |

The data in Table 12-2a shows that the largest single grains in the size distribution of the initial grit sample are 425 μm in size. The initial agglomerate size distribution data shows that all agglomerates are larger than 425 μm. After molding and washing, the retained, pressed agglomerates are all larger than 300 μm and 91.4 wt. % of the agglomerates are larger than the largest single grain 25 μm), confirming the retention of plurality of grains in the sintered agglomerates after molding a grinding wheel comprising the agglomerates.

TABLE 12-2b

Particle size distributions for Sample 12-2

| Sieve # ASTM-E | Sieve # ISO 565 size of opening μm | Initial grit size distribution | Initial agglomerate size distribution | Agglomerate size distribution after molding |
|---|---|---|---|---|
| 70 | 212 | 0 | | |
| 60 | 250 | 5 | | |
| 50 | 300 | 28 | | 0 |
| 45 | 355 | 53 | 0 | 6.3 |
| 40 | 425 | 14 | 0.2 | 2.3 |
| 35 | 500 | | 1.0 | 6.2 |
| 30 | 600 | 0 | 5.4 | 14.1 |
| 25 | 725 | | 15.1 | 21.9 |
| 20 | 850 | | 28.3 | 25.8 |
| 18 | 1000 | | 31.2 | 17.3 |
| 16 | 1180 | | 18.8 | 6.0 |
| −10/+12 | 1700 | | 0 | 0 |

The data in Table 12-2b shows that the largest single grains in the size distribution of the initial grit sample are 425 μm in size. The initial agglomerate size distribution data shows that 99.8 wt. % of the agglomerates are larger than 425 μm. After molding and washing, the retained, pressed agglomerates are all larger than 300 μm, and 91.4 wt. % of the agglomerates are larger than the largest single grain (425 μm), confirming the retention of plurality of grains after molding.

TABLE 12-2c

Particle size distributions for Sample 12-3

| Sieve # ASTM-E | Sieve # ISO 565 size of opening μm | Initial grit size distribution | Initial agglomerate size distribution | Agglomerate size distribution after molding |
|---|---|---|---|---|
| 70 | 212 | 0 | | |
| 60 | 250 | 5 | | |
| 50 | 300 | 28 | | 0 |
| 45 | 355 | 53 | 0 | 7.2 |
| 40 | 425 | 14 | 2.5 | 2.9 |
| 35 | 500 | | 1.3 | 5.1 |
| 30 | 600 | 0 | 2.7 | 8.5 |
| 25 | 725 | | 5.8 | 11.8 |
| 20 | 850 | | 12.3 | 17.2 |
| 18 | 1000 | | 24.3 | 21.5 |
| 16 | 1180 | | 49.1 | 25.8 |
| −10/+12 | 1700 | | 1.9 | 0 |

The data in Table 12-2c shows that the largest single grains in the size distribution of the initial grit sample are 425 µm in size. The initial agglomerate size distribution data shows that 97.5 wt. % of the agglomerates are larger than 425 µm. After molding and washing, the retained, pressed agglomerates are all larger than 300 µm, and 89.9 wt. % of the agglomerates are larger than the largest single grain (425 µm), confirming the retention of plurality of grains after molding.

These results demonstrate that agglomerates made according to the invention have sufficient strength to withstand commercial abrasive wheel molding and handling operations. The abrasive grains present in the molded wheel retain a three-dimensional structure characteristic of the initial abrasive grain agglomerates. A major percentage (i.e., at least 85 weight %) of the agglomerates retain a plurality of abrasive grains held in a three-dimensional shape of approximately the same size as the initial size of the sintered agglomerates after handling and molding.

EXAMPLE 13

The structures of abrasive grinding wheels made with the agglomerates of the invention were compared under a scanning electron microscope to the structures of comparative grinding wheels. The comparative wheels were made without the agglomerates, but comprising the same abrasive grain and bond materials in the same volume percentages of grain, bond and porosity as the grinding wheels of the invention.

Agglomerates (sample no. 66) were prepared as described in Example 10, except the temperature was maintained constant at 1150° C.

Agglomerate sample 66 was made with 150 lbs (68.04 Kg) abrasive grain (80 grit 32A alumina grain, obtained from Saint-Gobain Ceramics and Plastics, Inc.) and 10.23 lbs (4.64 Kg) Binding Material C (yielding 6.82 wt % binding material in the sintered agglomerate). The Binding Material was dispersed in Binder 3 (3.75 lbs; 1.701 Kg) prior to addition to the grain.

Experimental wheels were made as described in Example 10 from agglomerate sample 66. Comparative commercial wheels marked as 32A80L8VFL, obtained from Saint-Gobain Abrasives, Inc., were selected for comparison.

Figure 2:
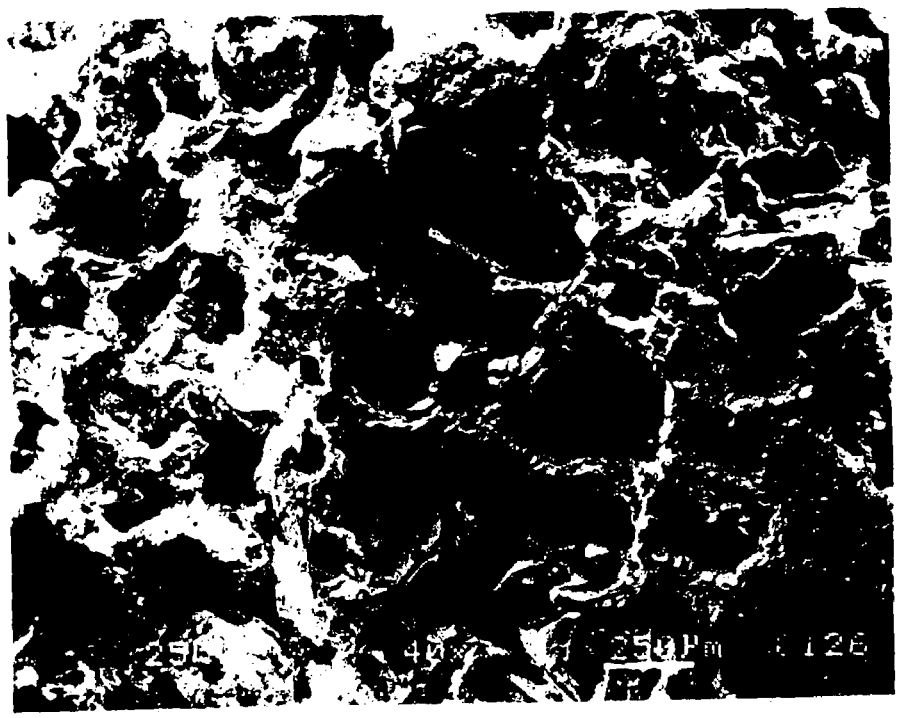
FIG. 2 is a photomicrograph of a cross-section of an abrasive wheel of the invention made with agglomerated grain (lighter areas of photos), and having intra-agglomerate porosity (smaller darker areas of photo) and inter-agglomerate, interconnected porosity (darker areas of photo).

A photograph of a cross-section of each wheel was taken at a magnification of 40×. These photographs are shown in FIG. 2 (experimental wheel with agglomerates) and 3 (comparative wheel without agglomerates). It can be seen that the agglomerates and the pores are irregularly and randomly shaped and sized. The comparative wheel has a much more ordered and regular structure. It is possible to observe two types of pores in the wheels made with the agglomerates: intra-agglomerate pores and larger inter-agglomerate pores appearing as distinct channels between agglomerates. From permeability testing of the experimental wheels it has been established that the inter-agglomerate pores are interconnected and render the entire wheel permeable to fluids. Thus, the abrasive grinding wheels of the invention exhibit a porosity that includes a major amount of interconnected porosity (i.e., at least 30 volume % interconnected porosity) and, preferably, a bimodal porosity distribution. The abrasive grinding wheels of the invention are characterized by a much more open composite structure than conventional grinding wheels.

Figure 3:
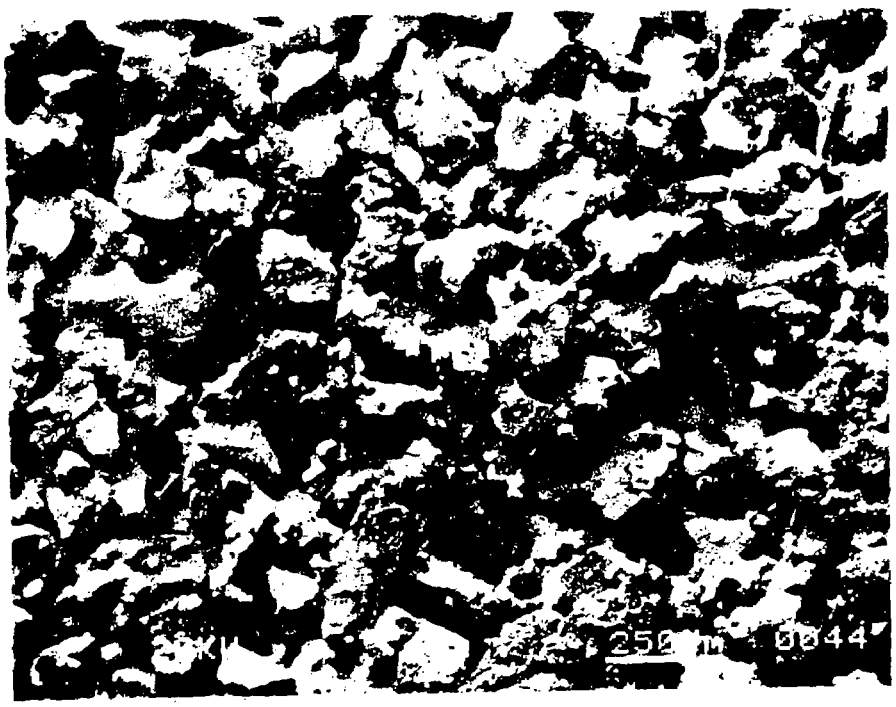
FIG. 3 is a photomicrograph of a cross-section of a comparative abrasive wheel of the prior art, showing the absence of agglomerated grain and the absence of large interconnected porosity in the structure of the wheel.

As can be observed from FIGS. 2 and 3, the maximum dimension of the inter-agglomerate pores is about 2–20 times larger than the maximum dimension of the intra-agglomerate pores. The exact ratio of pore size depends upon the composition of the wheels. The ratio of 2–20 applies to these wheels made with a range of about 8–10 volume percent bond, and an average abrasive grain size of about 260 microns. In general, for the abrasive wheels of the invention, as the volume percentage bond increases from this range, the intra-agglomerate pores become smaller, but the inter-agglomerate pores retain a maximum dimension roughly equivalent to the maximum dimension of the abrasive grain used in the agglomerates. As the volume percentage bond decreases from this range, the intra-agglomerate pores become relatively larger, but the inter-agglomerate pores retain a maximum dimension roughly equivalent to the maximum dimension of the abrasive grain used in the agglomerates.

In further microscopic examinations of the wheels made with agglomerates, particularly with agglomerates containing at least 6 weight % binding material, it has been observed that increasing the weight percentage of added bond material results in a wheel structure having much smaller intra-agglomerate pores. For example, with a higher binding material weight % and a higher bond volume %, the size ratio can be about 20–200 times larger for the inter-agglomerate pores than for the intra-agglomerate pores. It is believed the bond material added to the agglomerates is drawn into the interstitial area of the agglomerates during mixing, molding and thermal processing of the wheels, thereby narrowing or closing off some of the intra-agglomerate porosity and eventually causing a loss of bimodal pore distribution.

EXAMPLE 14

Sintered agglomerates were prepared by a batch oven method from the materials described in Table 14-1. The abrasive grain was 100 grit (0.173 mm) size 38A alumina grain, obtained from Saint-Gobain Ceramics & Plastics, Inc., Worcester, Mass.

TABLE 14-1

Sintered Agglomerate Composition

| Materials | Weight % of Pre-fired Mixture | Weight % of Agglomerate |
| --- | --- | --- |
| Binding Material A | 2.85 | 3.0 |
| Binder | 1.46 | 0.0 |
| Walnut Shell Particles | 4.34 | 0.0 |
| 38A Abrasive Grain | 91.35 | 97.0 |
| Total | 100.00 | 100.0 |

In the first step of forming the agglomerate particles, the abrasive grain and walnut shell particles were blended in a Hobart® mixer (laboratory Model N-50). This blend was subsequently wetted with an effective amount of organic liquid binder (a mixture of 40 wt % liquid animal glue, 30 wt % powdered maleic acid and 30 wt % water) to adhere the binding material powder to the grain. After wetting these particles, a powder mixture containing the binding material components (a vitrified bond composition having the fired composition shown above as "Binding material A") was added and mixed. The binding material adhered to the wetted particles and this mixture was then loosely spread over a ceramic firing batt.

The mixture was fired at 1230° C. for four hours in an electric kiln. After firing, the sintered agglomerates were obtained from the fired mixture by crushing the mixture in a mortar with a pestle. The sintered agglomerates were sized into three sizes with U.S. standard testing sieves mounted on a vibrating screening apparatus (Ro-Tap; Model RX-29; W.S. Tyler Inc. Mentor, Ohio). The loose packed density of the sintered agglomerates (LPD) was measured by the American National Standard procedure for Bulk Density of Abrasive Grains.

After the sizing process, the sintered agglomerates had three-dimensional shapes (varying among triangular, cubic, rectangular and various other geometric shapes) and were of the size and LPD shown in Table 14-2.

TABLE 14-2

Sized Sintered Agglomerates

| Sintered Agglomerate Sample | Grit Size | Apporoximate Size in mm (FEPA) | LPD g/cc |
|---|---|---|---|
| 14-1 | −40/+50 mesh (300–425 μm) | 1.12 (46) | 0.300–0.425 |
| 14-2 | −50/+60 (250–300 μm) | 1.33 (54–60) | 0.250–0.300 |
| 14-33 | −30/+40 (425–600 μm) | 0.94 (36) | 0.425–0.600 |

Additional agglomerates were made by slight variations of this process. The variations included the following. The prepared mixture was wet-screened through box screens (8 to 12 mesh) onto trays. The screened material was then air or oven dried. The material was loaded into ceramic batts. The ceramic batts containing the material were fired in periodic or tunnel kilns under firing conditions ranging from 1225 to 1280 degrees C. for times ranging from 30 to 360 minutes. The fired material was removed from the ceramic batts and processed through a roll crusher to break up the material into agglomerates.

The crushed material was sized to the desired range using a Ro-Tap apparatus.

Abrasive Wheels

The finished wheels were 3.0×0.525×1.25 inches (7.6× 1.34×3.2 cm) in size. The composition of the wheels (volume % of the fired wheels), density, air permeability, grade and modulus properties of the wheels are described in Table 14-3.

The bond used for wheel samples 1, 2 and 3 of the invention was a vitrified bond material having the fired molar composition of Binding material B of Table 2, above. The bond used in the comparative wheel sample had the fired molar composition of Binding material A of Table 2.

The sintered agglomerates and bond mixture of samples 1, 2 and 3 of the invention were dry blended in a Hobart mixer, filled into molds, cold pressed and fired at a maximum temperature of 735° C. for 4 hours to form the grinding wheel.

The comparative wheel sample was made by blending the vitrified bond components with the abrasive grain in a Hobart mixer. The abrasive grain used in the comparative sample was a 38A alumina grain, 100 grit size (125 μm), obtained from Saint-Gobain Ceramics & Plastics, Inc., Worcester, Mass. After blending, the mix was molded, pressed and fired at 1230° C. for 4 hours to form the grinding wheel.

Grinding Test 14-A

The wheels of the invention and the comparative wheels were tested in an internal diameter, creepfeed grinding test using the following conditions.

Grinding Conditions:

Machine: Heald CF, OD/ID Grinder
Mode: Internal diameter (ID) creepfeed grind
Wheel speed: 6,319 rpm; 4,968 surface feet per minute (25 M/sec)
Work speed: 20 rpm
Grinding mode: ID climb plunge
Infeed rate: 0.025 inch (0.64 mm)/0.050 inch (1.27 mm) on diameter
Coolant: Trim E210, 5% ratio with deionized well water, 9 gal/min (34 L/min)
Workpiece material: 52100 Steel 4 inch (10.2 cm) ID×0.250 inch (1 cm), Rc-62.0 hardness
Rotary dress: AX1440, comp. 0.0005 inch, 0.005 inch lead, 2600 rpm

TABLE 14-3

Abrasive Wheels

| Wheel Sample (agglomerate sample[a]) | Ex. 1 Agglom Vol % | Bond Vol % Bond B | Porosity Vol. % | Relative Air Permeability[b] | Fired Density g/cc | Mod. of Elasticity $d/cm^2 \times 10^{10}$ | Grade |
|---|---|---|---|---|---|---|---|
| 14-1 | 36 | 6.4 | 57.6 | n/a | 1.577 | 14.3 | D |
| 14-2 | 36 | 6.4 | 57.6 | 51.0 | 1.673 | 20.7 | F |
| 14-3 | 40 | 6.4 | 53.6 | n/a | 1.831 | 28.4 | H |
| comparative sample 14-C1 | 0.0 (grain = 36 vol %) | 5.5 | 58.5 | 28.5 | 1.564 | 12.9 | D |

[a]Agglomerates contained 97 wt % 100 grit 38A alumina grain and 3 wt % Binding material A and were screened to a particle size of −40/+60 mesh (250 to 425 μm).
[b]Fluid (air) permeability was measured by the test methods disclosed in U.S. Pat. Nos. 5,738,696 and 5,738,697, assigned to Norton Company. Relative air permeability values are expressed in cc/second/inch of water units. (A 2.2 size nozzle was used on the apparatus).
c. At 36 vol. % abrasive grain, the comparative wheels contained a greater volume % abrasive grain (i.e., 1–3 volume % more) than the experimental wheels made with 36–40 vol. % agglomerated grain, binding material and intra-agglomerate porosity.

In these grinding runs, the maximum material removal rates (MRR) at the initial workpiece burn (or initial wheel failure) were measured and the results observed. Results of these grinding tests are shown in Table 14-4.

TABLE 14-4

Grinding Test Results

| Sample | MRR mm³/s, mm | G-ratio MRR/WWR | Specific Energy W · s/mm³ | Grindability mm³/W · s |
|---|---|---|---|---|
| comparative wheel | 1.288 | 81.0 | 40 | 2.59 |
|  | 2.482 | 40.4 | 67 | 1.50 |
|  | 4.544 | 24.3 | 113 | 0.97 |
| Max. MRR | 5.662 | 2.9 | 123 | 0.13 |
| 14-1 | 1.247 | 90.9 | 42 | 2.73 |
|  | 2.534 | 85.5 | 69 | 3.12 |
|  | 4.870 | 37.3 | 110 | 1.66 |
| Max. MRR | 6.680 | 5.7 | 145 | 0.26 |
| 14-2 wheel | 2.554 | 113.7 | 69 | 4.19 |
|  | 4.921 | 76.1 | 131 | 2.86 |
|  | 8.061 | 34.1 | 208 | 1.32 |
| Max. MRR | 11.116 | 10.9 | 265 | 0.46 |
| 14-3 wheel | 2.483 | 122.3 | 78 | 3.89 |
|  | 5.111 | 79.4 | 132 | 3.07 |
|  | 8.534 | 34.5 | 265 | 1.11 |
| Max. MRR | 11.545 | 10.0 | 340 | 0.34 |

The results show the grinding wheels made according to the invention were superior in MRR to the closest comparative grinding wheels, and the superior performance did not cause excessive power draw (specific energy W.s/mm³) or damage to the surface of the workpiece. Experimental wheels also showed G-ratio and grindability index improvements. Furthermore, the grit size of the grain used in the sintered agglomerates of the wheels of the invention was smaller than the grit size of the grain used in the comparative wheel. All other variables being equal, smaller grit size yields inferior G-ratio and grindability index. Thus, the superior performance of the inventive wheels is significant and unexpected.

Grinding Test 14-B

A second series of grinding runs was conducted with the same group of wheel samples under the following surface grinding conditions using 4340 steel as the workpiece.

Grinding Conditions:
Machine: Brown & Sharp Micr-a-size Grinder
Mode: Surface creepfeed grind
Wheel speed: 6,000 rpm
Table speed: 0
Downfeed: 1.270 mm
Infeed: 1.270 mm
Coolant: Trim VHPE 210, 1:20 ratio with deionized well water, 9 gal/min (34 L/min)
Workpiece material: 4340 Steel; 51 Rc hardness; 95.4 mm length; 203.2 mm width
Dressing: single point diamond tool, comp. 0.025 mm, speed 254 mm/min

TABLE 14-5

Grinding Test Results (Average of Multiple Runs)

| Sample (run) | MRR mm³/s, mm | G-ratio WWR/MRR | Specific Energy W · s/mm³ | Grindability mm³/W · s |
|---|---|---|---|---|
| 14-C1 comparative wheel |  |  |  |  |
| 1 | 3.032 | * | 49.46 | * |
| 2 | 4.500 | 54.1 | 41.3 | 1.311 |
| 3 | 7.597 | 10.5 | 72.53 | 0.144 |
| 14-1 wheel |  |  |  |  |
| 1 | 3.045 | 32.7 | 51.61 | 0.635 |
| 2 | 4.510 | 23.2 | 82.50 | 0.281 |
| 3 | 7.597 | 33.4 | 32.00 | 1.045 |
| 14-2 wheel |  |  |  |  |
| 1 | 2.987 | 160.8 | 57.86 | 2.780 |
| 2 | 4.548 | 163.9 | 40.53 | 4.043 |
| 3 | 7.597 | 83.4 | 30.34 | 2.750 |
| 14-3 wheel |  |  |  |  |
| 1 | 3.052 | 27.4 | 52.34 | 0.523 |
| 2 | 4.577 | 164.9 | 53.73 | 3.069 |
| 3 | 7.742 | 10.7 | 56.11 | 0.190 |

* G-ratio and grindability could not be measured for this run.

The results show the grinding wheels made according to the invention were superior in G-ratio and grindability index to the closest comparative grinding and the superior performance did not cause excessive power draw or to the surface of the workpiece.

EXAMPLE 15

Additional abrasive wheels were made from sintered agglomerates prepared according to the method of Example 14, except different types of abrasive grains and binding materials were used in the sintered agglomerate samples. The compositions of the agglomerates and of the abrasive wheels are set forth in Table 15-1. In the wheels of the invention, the vitrified bond materials were selected to have a melting temperature at least 150° C. higher than the melting temperature of the binding materials in the agglomerates used to make the wheels.

All sintered agglomerates contained 3 wt % binding material and 97 wt % grain and were screened to a particle size of −20/+45 mesh (US standard sieve size) (355 to 850 µm).

The finished wheels were 7.0×0.50×1.25 inches (17.8× 1.27×3.2 cm) in size. The composition of the wheels (volume % of the fired wheels), density, and modulus properties of the wheels are described in Table 15-1.

The bond for the experimental wheels had the molar composition of Binding material B of Table 2 and the wheels made with this bond were fired at 735° C. for 4 hours. The comparative wheels were made with a vitrified bond having the molar composition of Binding material C of Table 2 and these wheels were fired at 900° C. for 8 hours. Comparative wheels made without sintered agglomerates contained 40 vol % abrasive grain and either 10.26 vol % (H grade hardness) or 6.41 vol % (F grade hardness) vitrified bond.

TABLE 15-1

Agglomerates and Abrasive Wheels

| Experimental Wheel Sample (Grade) | Agglomerate Grain Grit Size Binding material | Agglomerate Vol % | Bond Vol % | Porosity Vol. % | Relative Air Permeability[b] | Fired Density g/cc | Mod. of Elasticity d/cm² × 10¹⁰ |
|---|---|---|---|---|---|---|---|
| 15-1 (H) | 32A-II 60 grit Binding material A | 40 | 10.3 | 49.7 | 34.4 | 1.847 | 27.8 |
| 15-2 (H) | Alomax ® 60 grit Binding material A | 40 | 10.3 | 49.7 | 33.4 | 1.835 | 27.3 |
| 15-3 (H) | Norton SG ® 60 grit Binding material D | 40 | 10.3 | 49.7 | 23.3 | 1.850 | 29.6 |
| 15-4 (F) | Norton SG 60 grit Binding material D | 40 | 6.4 | 53.6 | 46.5 | 1.730 | 20.9 |
| Comparative[a] samples grain = 40 vol % | Abrasive grain type | | | | | | |
| 15-C1 (H) | Norton SG 60 grit | 0.0 | 10.3 | 49.7 | 16.6 | 1.818 | 31.6 |
| 15-C2 (F) | Norton SG 60 grit | 0.0 | 6.4 | 53.6 | 35.1 | 1.715 | 22.1 |
| 15-C3 (H) | Norton SG 46 grit | 0.0 | 10.3 | 49.7 | 16.0 | 1.822 | 32.6 |
| 15-C4 (F) | Norton SG 60 grit | 0.0 | 6.4 | 53.6 | 41.9 | 1.736 | 23.1 |
| 15-C5 (H) | 32A-II 60 grit | 0.0 | 10.3 | 49.7 | 15.0 | 1.832 | 32.5 |
| 15-C6 (H) | Alomax 60 grit | 0.0 | 10.3 | 49.7 | 16.0 | 1.837 | 31.9 |

[a] At 40 vol. % abrasive grain, the comparative wheels contained a greater volume % abrasive grain (i.e., about 2–3 volume % more) than the experimental wheels made with 40 vol. % agglomerated grain, binding material and intra-agglomerate porosity.
[b] Fluid (air) permeability was measured by the test methods disclosed in U.S. Pat. Nos. 5,738,696 and 5,738,697, assigned to Norton Company. Relative air permeability values are expressed in cc/second/inch of water units. (A 2.2 size nozzle was used).

The properties of these wheels, especially the air permeability values within a single wheel grade, demonstrate a higher degree of interconnected porosity in the structures of the experimental wheels made from agglomerated abrasive grain than in comparative wheels made to the same volume percent porosity and grade with the same grain and bond materials. This structural difference has been observed in different wheel hardness grades, with different types of grain and bond and for different volume percentages of abrasive wheel components.

We claim:

1. A method of agglomerating abrasive grain, comprising the steps:
    a) feeding abrasive grain and a binding material, selected from the group consisting essentially of vitrified bond materials, vitrified materials, ceramic materials, inorganic binders, organic binders, water, solvent and combinations thereof, into a rotary calcination kiln at a controlled feed rate;
    b) rotating the kiln at a controlled speed;
    c) heating the mixture at a heating rate determined by the feed rate and the speed of the kiln to temperatures from about 145 to 1,300° C.,
    d) tumbling the grain and the binding material in the kiln until the binding material adheres to the grain and a plurality of the grains adhere together to create a plurality of sintered agglomerates; and
    e) recovering the sintered agglomerates from the kiln, whereby the sintered agglomerates have a three-dimensional shape, a loose packing density of $\leq 1.6$ g/cc and comprise a plurality of abrasive grains.

2. The method of claim 1, further comprising the step of making a uniform mixture of the abrasive grain and the binding material and then feeding the mixture into the rotary calcination kiln.

3. The method of claim 2, wherein the mixture is fed into the kiln at a feed rate of about 5 to 910 Kg/hr.

4. The method of claim 2, wherein the mixture feed rate is set such that the mixture occupies 8–12 volume % of the kiln volume.

5. The method of claim 2, wherein the mixture further comprises at least one component selected from the group consisting of secondary abrasive grain, filler materials, grinding aids, pore inducing media and combinations thereof.

6. The method of claim 2, wherein the mixture further comprises pore inducing media selected from the group consisting of hollow glass spheres, ground walnut shells, hollow spheres or beads of plastic material or organic compounds, foamed glass particles, bubble mullite and bubble alumina, and combinations thereof.

7. The method of claim 2, wherein the uniform mixture is agglomerated to form green agglomerates and then the green agglomerates are fed into the rotary calcination kiln.

8. The method of claim 1, wherein the mixture is tumbled in the heating kiln for about 0.25 to 2.0 hours.

9. The method of claim 1, wherein the sintered agglomerates are two to twenty times larger in size than the abrasive grain.

10. The method of claim 1,1 wherein the kiln is tilted to an angle of incline of about 0.5 to 5 degrees.

11. The method of claim 1, wherein the kiln is rotated at a speed of 0.5 to 10 rpms.

12. The method of claim 1, wherein the sintered agglomerates have a minimum crush strength of 0.5 at 50% crush fraction in a compaction test.

13. The method of claim 1, wherein the grain and the binding material are heated to a temperature of 800–1200° C. in the kiln.

14. The method of claim 13, wherein the temperature is effective to cause the binding material to melt and flow and the viscosity of the melted binding material is at least 300 poise.

* * * * *